United States Patent
Harrel et al.

(10) Patent No.: US 11,459,842 B1
(45) Date of Patent: Oct. 4, 2022

(54) HIGH PRESSURE AND HIGH FREQUENCY CONNECTOR AND ACTUATOR SYSTEM THEREFORE

(71) Applicant: BLUECORE COMPLETIONS, LLC, Midland, TX (US)

(72) Inventors: Travis Harrel, Midland, TX (US); Christian Leuchtenberg, Singapore (SG); Glen H. Cuiper, Haddon Township, NJ (US); J. Chambers Hall, Westbrook, TX (US)

(73) Assignee: BLUECORE COMPLETIONS, LLC, Midland, TX (US)

( * ) Notice: Subject to any disclaimer, the term of this patent is extended or adjusted under 35 U.S.C. 154(b) by 497 days.

(21) Appl. No.: 16/696,563

(22) Filed: Nov. 26, 2019

Related U.S. Application Data

(60) Provisional application No. 62/837,689, filed on Apr. 23, 2019, provisional application No. 62/812,831, filed on Mar. 1, 2019, provisional application No. 62/773,496, filed on Nov. 30, 2018.

(51) Int. Cl.
| | |
|---|---|
| *F16L 37/62* | (2006.01) |
| *E21B 33/038* | (2006.01) |
| *F16L 37/00* | (2006.01) |
| *E21B 43/013* | (2006.01) |
| *F16L 1/26* | (2006.01) |
| *E21B 17/08* | (2006.01) |

(52) U.S. Cl.
CPC .......... *E21B 33/038* (2013.01); *F16L 37/002* (2013.01); *E21B 17/085* (2013.01); *E21B 43/013* (2013.01); *F16L 1/26* (2013.01); *F16L 37/62* (2013.01)

(58) Field of Classification Search
CPC ........ E21B 17/02; E21B 17/04; E21B 17/046; E21B 17/0465; E21B 17/085; E21B 33/038; F16L 37/002
See application file for complete search history.

(56) References Cited

U.S. PATENT DOCUMENTS

| | | | |
|---|---|---|---|
| 3,498,325 A | 3/1970 | Ashton | |
| 4,391,297 A | 7/1983 | Knight | |
| 4,516,795 A * | 5/1985 | Baugh ................... | E21B 33/038 285/320 |
| 6,405,802 B1 | 6/2002 | Williams | |
| 7,677,623 B2 | 3/2010 | Bath et al. | |
| 7,793,724 B2 | 9/2010 | Daniel | |
| 7,841,394 B2 | 11/2010 | McNeel et al. | |

(Continued)

FOREIGN PATENT DOCUMENTS

| | | | | |
|---|---|---|---|---|
| GB | 2129895 A * | 5/1984 | .......... | E21B 33/038 |
| WO | WO-2013098560 A2 * | 7/2013 | ............ | E21B 17/02 |
| WO | 2018049360 A1 | 3/2018 | | |

*Primary Examiner* — Zachary T Dragicevich
*Assistant Examiner* — James A Linford

(57) ABSTRACT

A connector system for use during hydraulic fracturing operations includes a first connector having a bore and an annular interface defined by a plurality of surfaces disposed at selected angles with respect to each other. A second connector has an annular interface defined by a plurality of surfaces disposed at selected angles to each other. The plurality of surfaces of the annular interface of the first connector are adapted to engage the plurality of surfaces of the annular interface of the second connector to form a seal.

8 Claims, 21 Drawing Sheets

(56) References Cited

U.S. PATENT DOCUMENTS

| | | | |
|---|---|---|---|
| 8,590,556 | B2 | 11/2013 | Kendrick |
| 8,839,867 | B2 | 9/2014 | Conrad |
| 8,899,268 | B2 | 12/2014 | Garner et al. |
| 8,978,763 | B2 | 3/2015 | Guidry |
| 9,068,450 | B2 | 6/2015 | Guidry |
| 9,068,676 | B2 | 6/2015 | Morck |
| 9,605,525 | B2 | 3/2017 | Kajaria et al. |
| 9,903,190 | B2 | 2/2018 | Conrad et al. |
| 10,094,195 | B2 | 10/2018 | Guidry |
| 2004/0102069 | A1* | 5/2004 | Singeetham .......... E21B 33/038 439/157 |
| 2006/0201679 | A1 | 9/2006 | Williams |
| 2010/0300672 | A1 | 12/2010 | Childress et al. |
| 2015/0167398 | A1* | 6/2015 | Hoefler ................. E21B 17/085 166/367 |
| 2015/0275629 | A1 | 10/2015 | Hatton |
| 2016/0084065 | A1* | 3/2016 | DeBerry ............... E21B 19/165 166/336 |
| 2018/0163902 | A1* | 6/2018 | Manning ................. F16L 17/08 |
| 2018/0298698 | A1* | 10/2018 | Garro .................... E21B 33/038 |
| 2020/0208747 | A1* | 7/2020 | Babineaux .............. F16L 23/04 |
| 2022/0049803 | A1* | 2/2022 | Mannarino ......... E21B 33/0387 |

* cited by examiner

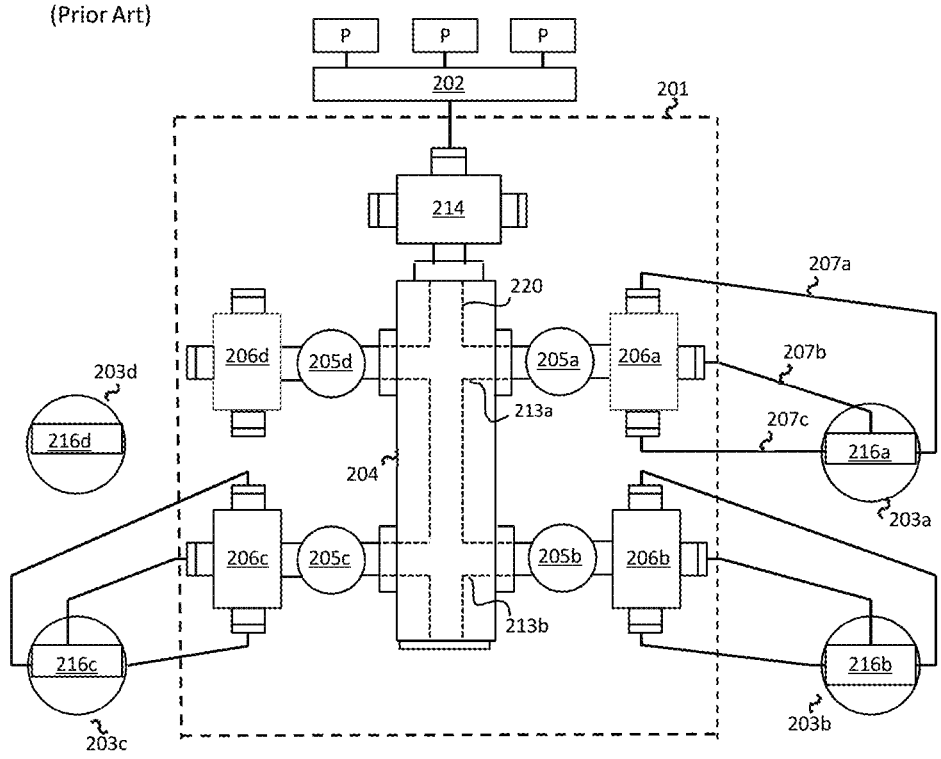
Fig. 2A
(Prior Art)
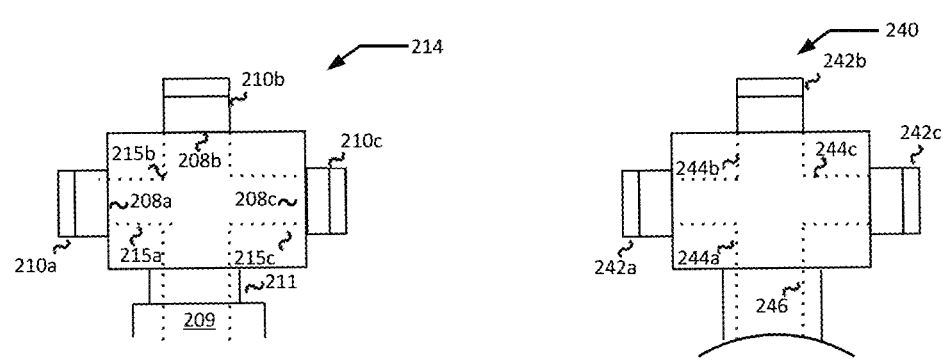
Fig. 2B
(Prior Art)
Fig. 2C
(Prior Art)

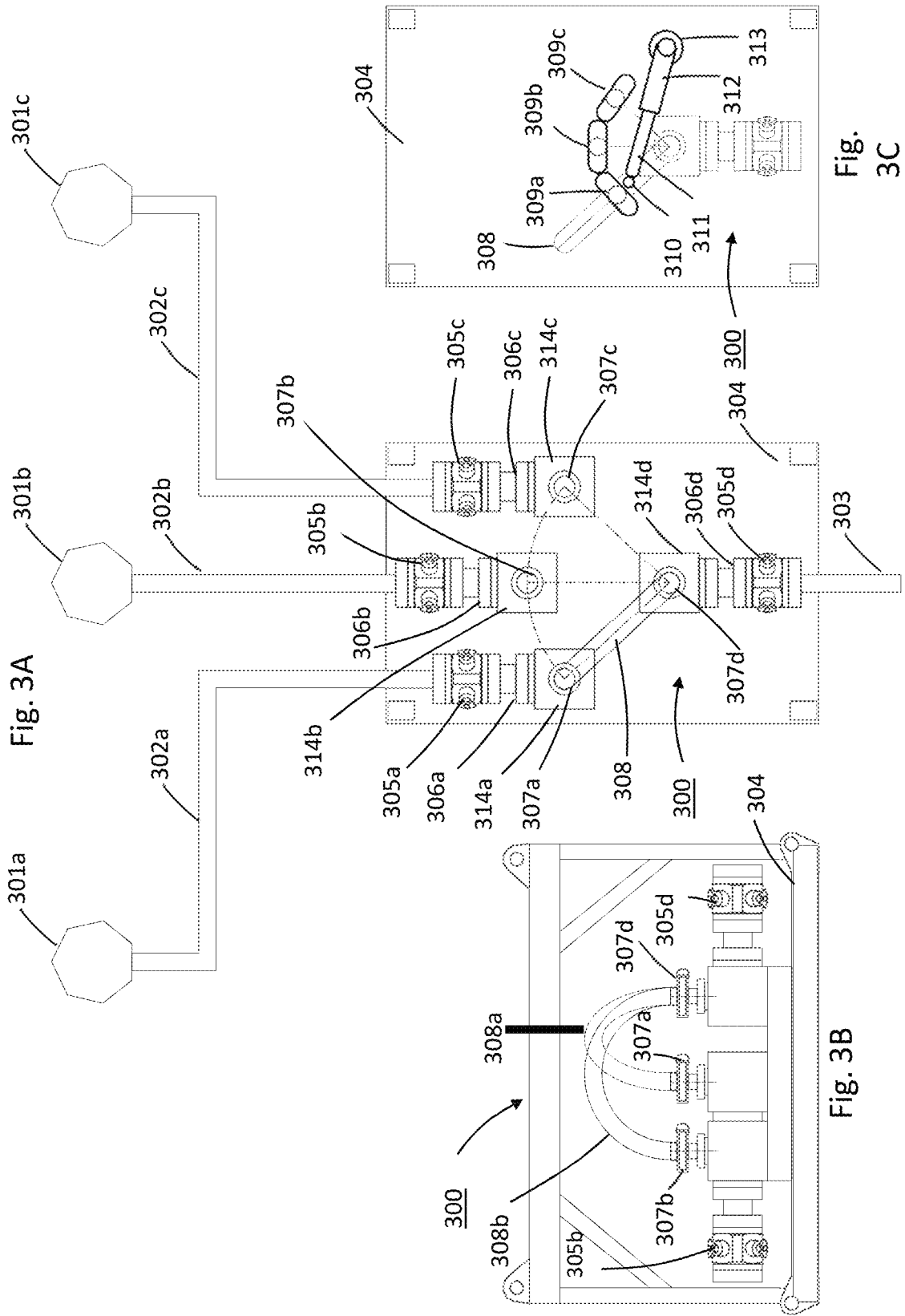

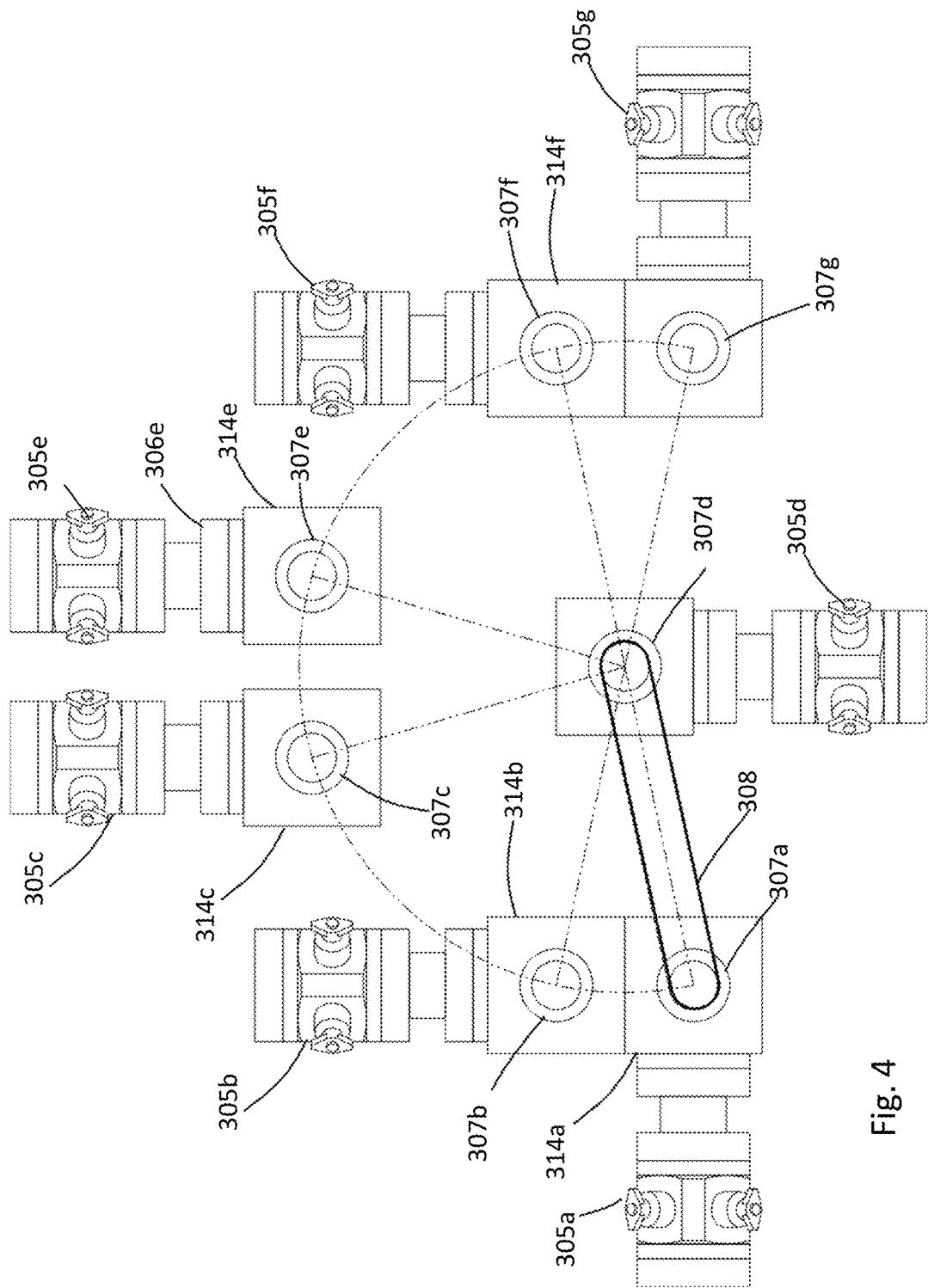

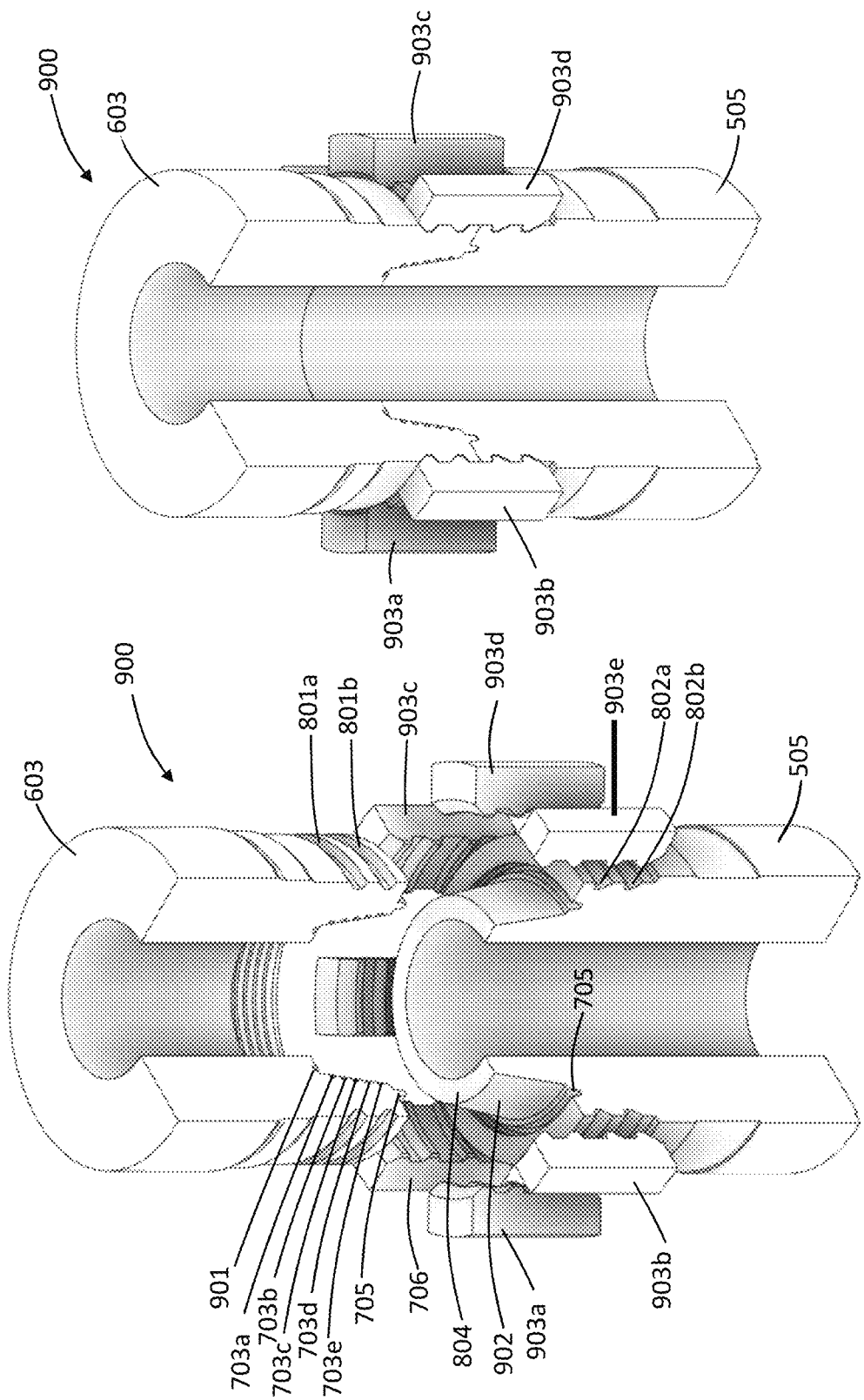

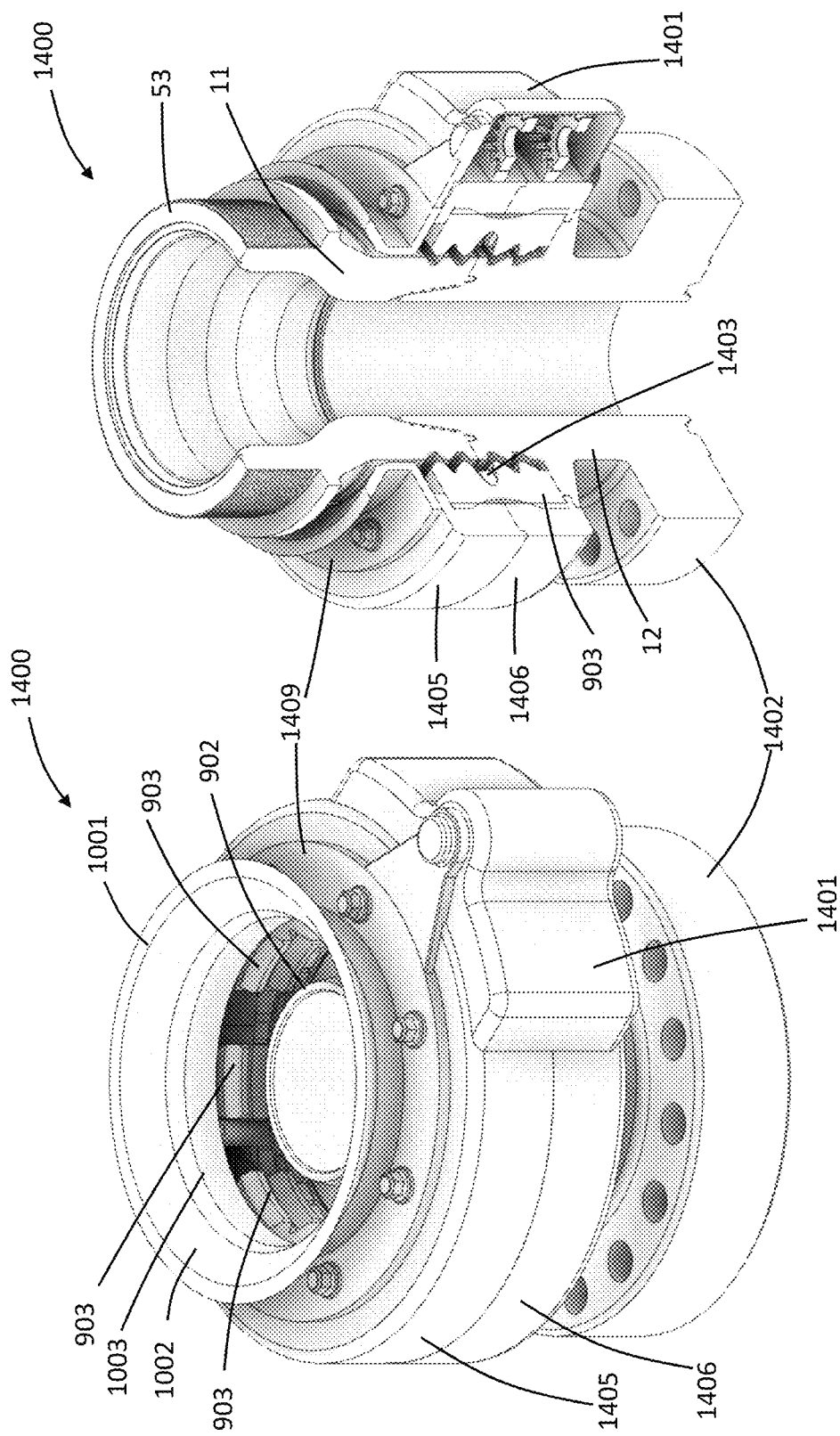

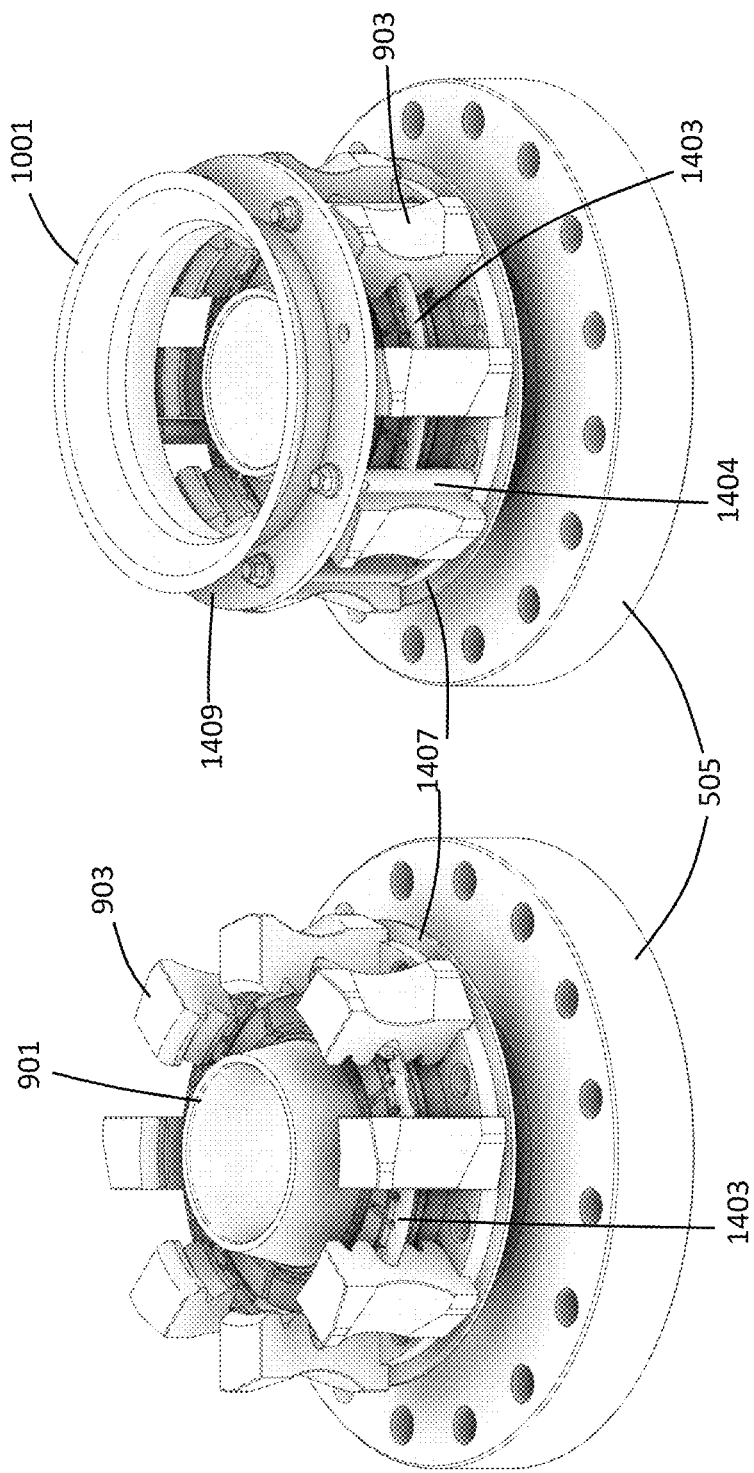

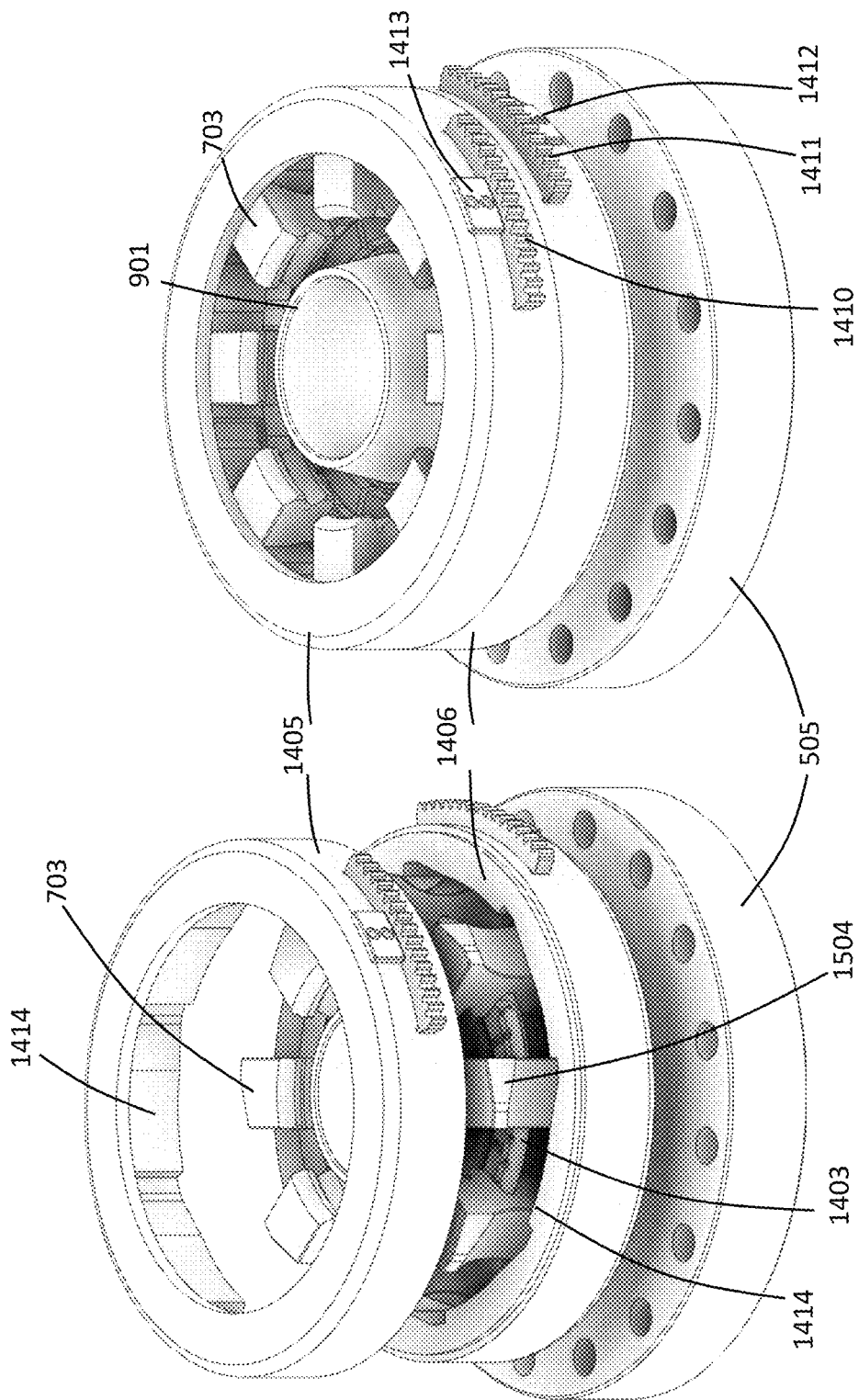

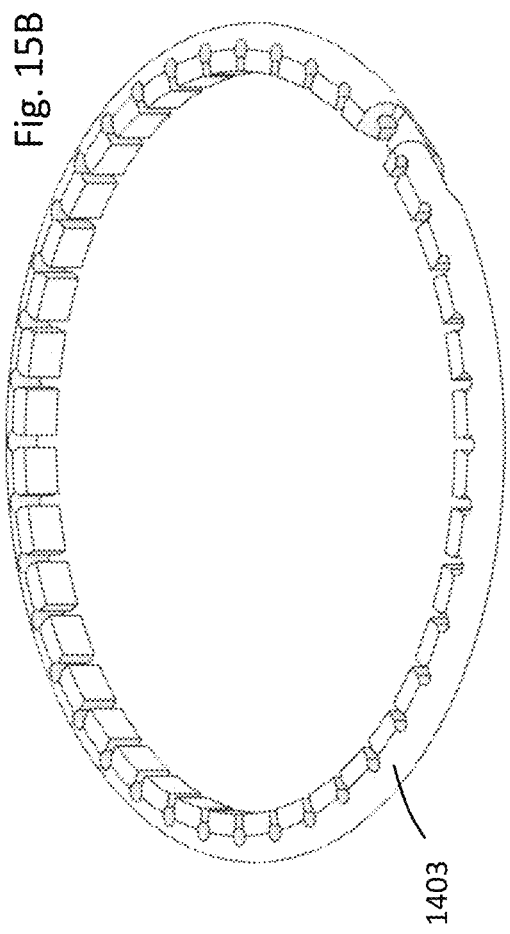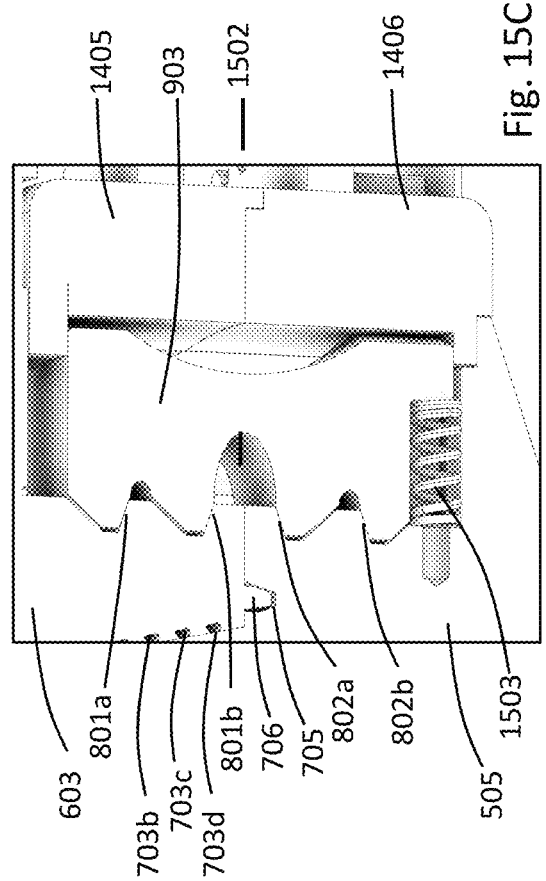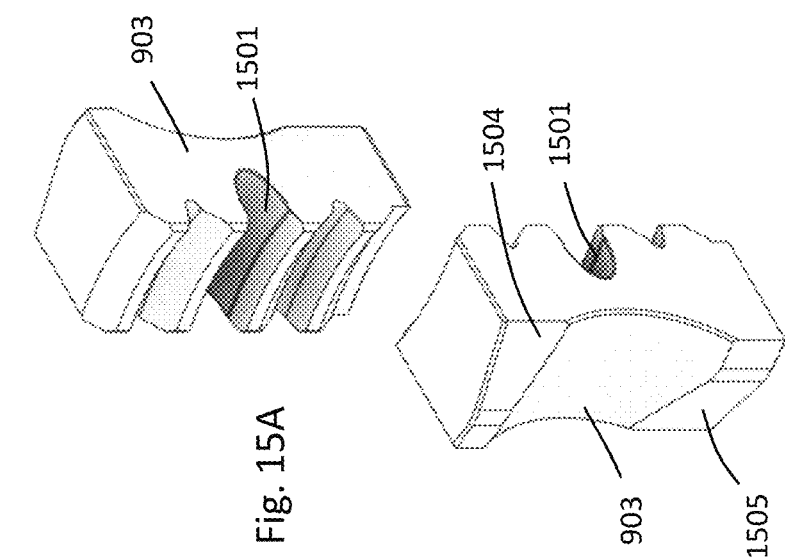

HIGH PRESSURE AND HIGH FREQUENCY CONNECTOR AND ACTUATOR SYSTEM THEREFORE

CROSS-REFERENCE TO RELATED APPLICATION

The present application claims the benefit of U.S. Provisional Application No. 62/773,496 for High Pressure Jumper Manifold, filed Nov. 30, 2018; U.S. Provisional Application No. 62/812,831 for High Pressure and High Frequency Connector, filed Mar. 1, 2019; and U.S. Provisional Application No. 62/837,689, for High Pressure and High Frequency Connector Actuator, filed Apr. 23, 2019, all of which are incorporated herein by reference in their entirety for all purposes.

FIELD OF INVENTION

The present invention relates in general to fluid stimulation equipment for oil and gas wells and in particular to a fluid direction manifold subjected to severe operating conditions, such as the high pressures, high flow rates, and abrasive fluids commonly found in hydraulic fracturing operations and other oil and gas stimulation applications.

BACKGROUND OF INVENTION

In one of the most severe service applications known today, hydraulic fracturing ("fracing"), very high pressure slurry is pumped at very high rates. In particular, fracing slurry is forced down a wellbore with enough pressure to fracture the hydrocarbon bearing rock formations and force particulates into the resulting cracks. When the pressure is released, the particles ("proppant"), which may be sand or other high compressive strength additives such as ceramic particles and bauxite, remain in the factures (cracks) and keep the fractures open. This "mechanism" then allows pathways for hydrocarbon to flow from the rock that was previously solid.

As the fracing industry becomes more efficient, multiple fracing stages are being pumped from a single "Tracing factory", consisting of many fracing pump trucks and accessory equipment to multiple wells, as first disclosed in U.S. Pat. No. 7,841,394, assigned to Halliburton. In order to make this process efficient, the concept of a distribution manifold was introduced as disclosed in US application 2010/0300672, assigned to FMC, which describes in detail the method of using such a manifold. This technique has become common practice, with this type of manifold commonly known as a zipper manifold in the hydraulic fracing industry.

When zipper manifolds started being used for fracing fluid distribution around 2009-2010, most wells were vertical and the number of stages being pumped per well was around 10 to 20. (A stage is the process of pumping a mixture of proppant [sand], water and some chemicals down a wellbore under high pressure, usually in excess of 9000 psi, for fracturing a specific interval of the wellbore.) Since then the industry has been getting more and more aggressive and most wells being fraced today are doing so in long horizontal wellbore sections having 50 to 100 stages.

A modern fracing operation typically runs 24 hours per day for several days. In the Permian basin of Texas, 70 fracing stages per well are now common. Each stage can last 1 to 2 hours and results in a small portion of the total wellbore being fractured. Then the pumps are stopped, and wireline is run. These wireline operations do a variety of things depending on the completion system being used. For example, a wireline can used be to set a plug, perforate a new zone, or open or close a sliding sleeve. This prepares a new section (interval) of the wellbore for fracing.

Then a new stage is pumped, fracturing the newly exposed wellbore. This process continues until all the sections of the wellbore have been fraced. It is common to achieve 8 to 15 fracing stages in a day, rotating the activity continuously between typically 3 wells. With 70 stages per well, this means that the zipper manifold is operating continuously for 14 to 28 days (excluding rig-up and rig-down time).

The frac flow is routed from the main incoming factory line (missile) to the distribution (zipper) manifold that is tied in to multiple wells. This allows simultaneous operations, and for a 3 well pad with a 3 way zipper manifold it means that one well is having a frac stage being pumped, one is idle and one is having wireline operations. The number of fracing stages is increasing with up to 100 stages and more per well being possible in the foreseeable future.

This means that the valves on the zipper manifold are being opened and closed over 100 times on a three well pad job resulting in many problems. One problem is the wear of valves and subsequent downtime as the conditions for valves are typically very harsh at the zipper manifold location. The particle size distribution in these fracing fluids is distributed so that the larger particles can prop open larger cracks and finer particles can prop open the very tips of the cracks, which are microscopic in nature. The particle sizes can vary from 0.004 inches to 0.01 inches (No. 140 Mesh to No. 8 Mesh). The pumping pressure can be up to 15,000 psi and the slurry velocity through a valve bore of 5.125 inches, as is typical of a 5⅛ inch, 15000 psi valve, is well above erosional velocity of about 50 to 70 feet per second. Moreover, the fracing is typically preceded and followed by an acid wash of 15% hydrochloric acid, which accelerates corrosion.

As one skilled in the art of mechanical engineering can ascertain, the fracing "mechanism" will inject proppant particles into any crack, orifice or possible leak path in the valve assembly. The injected particles remain in the valve assembly when the pressure is released. Small particles as large as 0.004 inches are within machining tolerances of steel parts and therefore will find their way into metal sealing surfaces. With the high velocity of abrasive fracing fluid, any weakness or point of turbulence can very quickly lead to a washout of a seal area or any interface. With ever increasing numbers of stages, the valve life limit can be reached during an operation resulting in repair/maintenance downtime. This is a safety problem as the repair person is exposed to an increased safety risk as all the equipment is interconnected.

With the zipper manifold always having one high pressure fracing operation concurrent with a residual pressure wireline operation, and possibly other preparation work on the idle well, there is a lot of room for errors. Even with procedures and strict protocols, accidents are common. A typical example occurs when there has been repair/maintenance work on a frac pump, after which the pump is started for testing. If this series of events was not properly regulated, high pressure can be applied accidentally via the zipper manifold to an undesired location.

The pressure pumping industry has become more automated with the use of hydraulic valves, which allow for automated operations from a safe remote location. As a result of this automation, human error has become more prevalent as it is very easy to simply "flip a switch" to open and close pressure barriers (i.e., valves). These pressure barriers are crucial for safety, since wells and pump trucks are potentially fatal pressure sources and the operation of an incorrect pressure barrier may result in a fatal incident.

In a typical operation occurring for a three well pad scenario, Well #1 is idle and the zipper valves are closed, which isolates pump pressure to the wellbore. Well #2 is pumping and the zipper valves are open, such that pressure from the pumps is applied to the wellbore. Well #3 is undergoing wireline operations and the zipper valves are closed, isolating the pump pressure from the wellbore and the wellbore pressure back to the pumps.

Once Well #2 finishes pumping and the zipper manifold valves are shut, Well #2 becomes idle. However, Well #2 is still under pressure from the last frac stage, such that if the zipper manifold operator is instructed to open Well #1 to begin pumping, but instead accidently opens Well #2, the pumps are exposed to wellbore pressure. In this scenario, it is highly probable that the high pressure piping connected to the pumps is disconnected, as the pumps also require frequent maintenance during operations. The workers repairing the pumps are then subject to injury.

When using a zipper manifold, the in-line flowline valves ("ground valves") between the zipper manifold and the pumps are typically left open because the zipper manifold valves are used to provide the primary pressure barrier, with two valves being used in series for double isolation. These valves are operated as isolation or flow pairs, being opened and closed one after another. The valves closest to the pumps on the manifold are exposed to every frac stage of all the wells being fraced. So, on a three well pad, these valves are subjected to up to 200 to 300 stages of frac slurry. Because of this, the zipper manifold valves are the most likely to malfunction, which causes the non-productive time and safety hazards.

It is of course possible to work without a zipper manifold and instead use a movable flowline, as disclosed in U.S. Pat. No. 8,590,556 assigned to Halliburton. Here the valves on the truck are used as isolation valves and the fracing line is disconnected and swung over to the next well being fraced. The well that is being wirelined and the well that is idle are both isolated as they are disconnected completely from the main fracing line that is connected to the pumps. This method eliminates the possibility of exposing the pumps to wellbore pressure of the wells not being fraced. However, this method requires workers to be in the "red zone" (i.e., the "widow maker area") a distance of 75-100' from an area around the flowline between the wellhead and pumps. The Halliburton design requires an operator to control the movable flowline from the truck within this "red zone".

There is a need to further reduce the activity of personnel in the dangerous area between the pump trucks and the wells. The introduction of zipper manifolds with hydraulic valve actuators has not fully solved this issue, as personnel are required more and more frequently to repair valves on the zipper manifold with ever increasing numbers of fracing stages. With these stages creating more demand on the pumps, these valves are also being repaired with ever increasing frequency on jobs. Both types of repairs require opening of components that are directly connected to pressure sources, either the well or the pumps. The easy actuation of valves via hydraulics has increased the number of safety incidents and this will continue to increase as maintenance activity increases with more stages.

The fracing industry in its desire to ever increase efficiency is now looking at 6 well pads, as horizontal placement of wellbores allows for design efficiency. This will mean one fracing factory of multiple pumps being interfaced with 6 wells using two three-way zipper manifolds or other efficient configurations with many more valves leading to further safety issues.

There is a need for a more reliable manifold solution that: eliminates down time due to valve repair; provides a safer method of operation and can be easily expanded to more well pads. Such a manifold solution termed "jumper manifold" is presented.

Advantageously such a jumper manifold requires a very reliable high-pressure connector that needs to be connected and disconnected many times during these types of continuous fracing operations without requiring maintenance.

SUMMARY OF INVENTION

To reduce the activity of personnel in the danger area, the inventive step is to remove the dual isolation valves being used as pressure barriers and to replace them with a jumper and sealing plugs. The jumper is a piece of pipe that can be easily moved between the main incoming flowline from the fracing factory and the outgoing line to each well. The jumper is installed between the incoming high pressure fracing line and the well being fraced. This means the other wells are physically completely disconnected from the high pressure incoming fracing line. Only the well being fraced is connected to the fracing factory. The removable sealing plugs are installed in the outgoing lines to the other wells. This makes it physically impossible to reroute pressure from a high-pressure source to a low pressure source. Any idle wells or wireline operations are fully isolated from the pump pressure source. There are no valves; therefore the new jumper manifold does not require the repair and maintenance issues of a zipper manifold with valves, which are the main cause of downtime.

The system is more reliable than valves as there are no moving valve parts to fail. The jumper and sealing plug connections are made under no pressure conditions and the design allows for multiple seal barriers that do not move when under pressure. The jumper and plugs are remotely operated to move between ports and latched with remotely controlled latches, requiring no personnel at the jumper manifold. Pressure interlocks are provided as part of the system to eliminate the possibility of opening a line under pressure. The design will allow the full number of stages to be pumped for each well without wear of the pressure connection and therefore will be safer as it will not require the maintenance of a zipper manifold.

The jumper and the plug connection to the manifold disclosed is an advantageous solution that can endure the hundreds of connection and disconnection sequences required, and seal high-pressure reliably without requiring maintenance, while in use for many days during a multi-well fracing operation. Such a connection as advantageously designed fit for purpose is more reliable than a valve and this is the goal of this invention which is to have a more reliable manifold, replacing conventional zipper manifolds, that does not require any valves.

As will be shown in embodiments of the invention, using the system for more than three wells as is current practice is easily achieved with this advantageous design.

BRIEF DESCRIPTION OF DRAWINGS

For a more complete understanding of the present invention, and the advantages thereof, reference is now made to the following descriptions taken in conjunction with the accompanying drawings, in which:

FIG. 2A is diagram of a typical conventional zipper manifold system;

FIG. 2B is an enlarged view of the input connector assembly (cross) of FIG. 2A;

FIG. 2C is an enlarged view of the output connector assembly (cross) of FIG. 2A;

FIG. 3A is a schematic plan view of an exemplary embodiment of an installed jumper manifold system according to the present principles;

FIG. 3B is a side view of the jumper manifold system of FIG. 3A;

FIG. 3C depicts a detail of manipulation of the jumper system of FIG. 3A;

FIG. 4 is an alternate jumper manifold embodiment of the principles of the invention adapted to connect with up to six wells;

FIG. 9A is cross section of the embodiment of the connector of FIGS. 7 and 8A in the disconnected position;

FIG. 9B is cross section of the embodiment of the connector of FIGS. 7 and 8A in the connected position;

FIG. 14A is an isometric view of the bottom part of the connector of FIG. 7 with an actuation mechanism according to the principles, the top part of the connector not being shown;

FIG. 14B is an isometric quarter cut away view of the complete connector of FIG. 7, with the top and bottom parts of the connector engaged but not locked;

FIGS. 14C-14F are various isometric views of the connector mechanism in various stages of assembly;

FIG. 15A is a detailed isometric view of representative locking dogs, shown, for example, in FIG. 14C;

FIG. 15B is an isometric view of the spring shown, for example, in FIG. 14C;

FIG. 15C is a detailed side cross section view of a representative connector dog with an alternative spring location;

DETAILED DESCRIPTION OF THE INVENTION

The principles of the present invention and their advantages are best understood by referring to the illustrated embodiment depicted in FIGS. 1-18 of the drawings, in which like numbers designate like parts.

Figure 1:
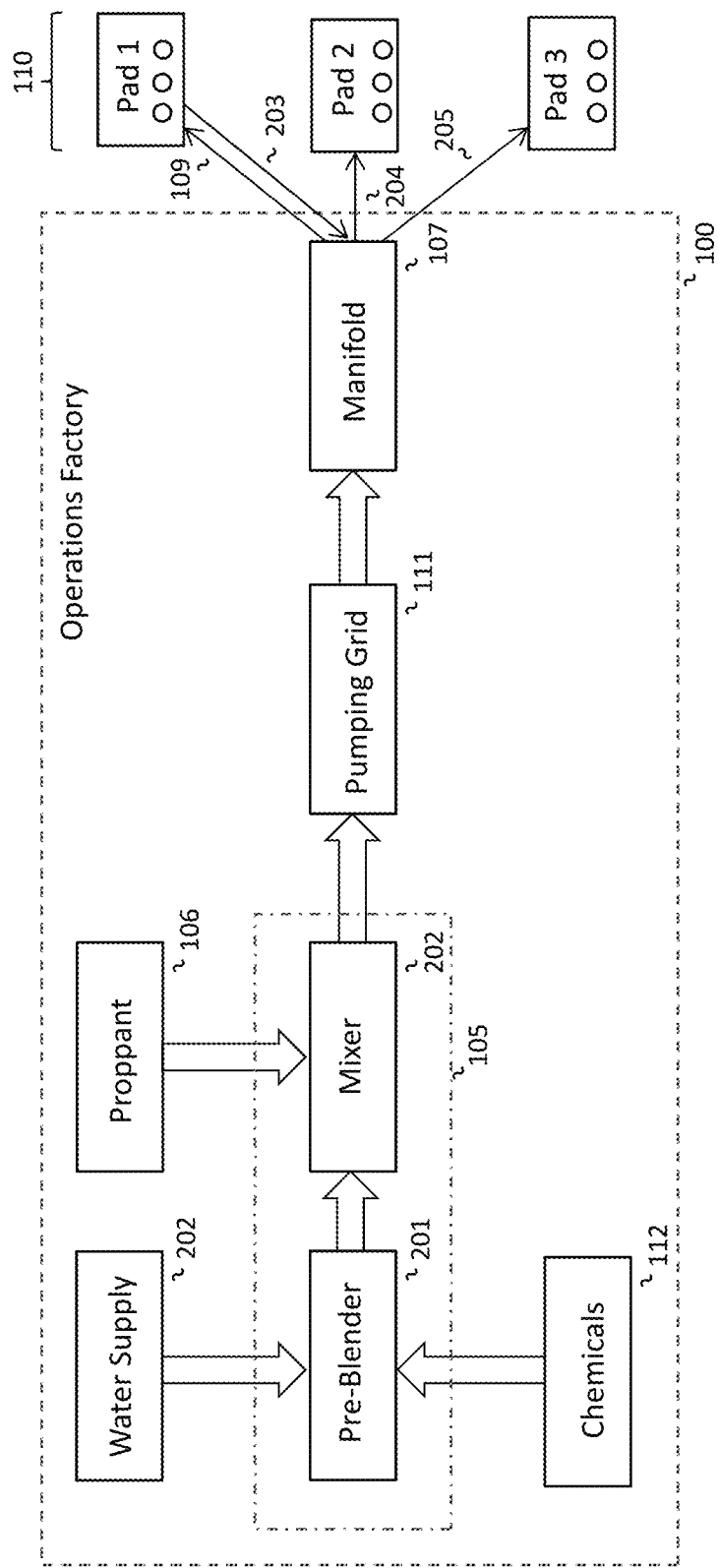
FIG. 1 is a block diagram of a typical conventional fracing operation installation.

FIG. 1 is a block diagram of a prior art hydraulic fracturing installation, as disclosed in U.S. Pat. No. 7,841, 394 assigned to Halliburton. FIG. 1 shows the typical installation used for most fracing operations, which includes an operations factory 100 consisting of a blending unit 105 connected to a chemical storage system 112. The blending unit 105 includes a pre-blending unit 106 wherein water is fed from a water supply 108 and blended with various chemical additives and modifiers provided by the chemical storage system 112.

This mixture is fed into the blending unit's hydration device and the now near fully hydrated fluid stream is blended in the mixer 107 with proppant from the proppant storage system 109 to create the final fracturing fluid. This process can be accomplished continuously at downhole pump rates. The final fluid is directed to a pumping grid 111, which commonly consists of several pumping units that pressurize the frac fluid, which is subsequently directed to a central manifold 107. The central manifold 107 connects and directs the fluid via connections 109a-109c to multiple wells 110 simultaneously or sequentially. The manifold 107 is typically known in the industry as a zipper manifold. One advantage of the principles of the present invention is the replacement of this manifold.

FIG. 2A is a prior art design of a typical zipper manifold system having the common features used by almost all fracing companies today. In particular, FIG. 2A shows a zipper manifold 201 connected between a high-pressure frac vessel 202 and a number of representative wellheads 203a-203c. The high pressure frac vessel 202 is fed by a number of high pressure pumping units P. In certain applications, however, the high pressure frac vessel 202 may be eliminated and the pumping units P connected directly to the zipper manifold 201. The zipper manifold 201 includes a block member 204, which is ideally a solid piece of metal through which a flow bore is machined. The flow bore includes an inlet branch 220 and a number of outlet branches 213. At least one inlet cross 214 is connected to the block 204 by suitable means, such as bolts (not shown).

Referring also to FIG. 2B, the inlet cross 214 comprises a body 211 and a number of inlet bores 215, each of which extends through the body between a corresponding inlet port 208 and a common outlet bore 209. The inlet cross 214 is connected to the body such that the outlet bore 209 is in fluid communication with the inlet branch 220 of manifold 201. The inlet cross 214 also includes a number of inlet connection adapters 210, each of which is connected to the body 211 over a corresponding inlet port 208 by, for example bolts. The inlet connection adapters 210 may comprise any suitable connector to which a corresponding connector may be secured, such as an adapter union.

The zipper manifold 201 also includes a number of valves 205a-205d, each of which is connected (e.g., bolted) to the block 204 over a corresponding end of an outlet branch 213. Thus, each valve 205 serves to control the flow of fluid from a corresponding outlet branch 213. Although the valves 205 may comprise any suitable flow control device, in FIGS. 2A and 2B they are manually operated gate valves. Today, modern zipper manifolds usually have dual isolation valves instead of the single isolation valves 205, which may also be plug valves. These dual isolation valves are usually equipped with hydraulic actuators that are remotely controlled. The zipper manifold 201 further includes a number of outlet crosses 206a-206d, each of which is connected to a corresponding valve 205. The outlet crosses are ideally of identical construction to the inlet cross 214 discussed above.

Referring also to FIG. 2C, each outlet cross 206 comprises a number of outlet connection adapters 242a-242c, similar to the inlet connection adapters 210, which are each connected to a corresponding outlet passage 244a-244c. The outlet passages 244 are each connected to a common inlet passage 246. The inlet passage 246 is in turn connected via the valve 205 to a corresponding outlet branch 213 in the block 204. Thus, each valve 205 serves to control the flow of fluid from the flow bore 220 to all of the outlet passages 244 in a corresponding outlet cross 206.

In use, the high pressure frac vessel 202 is connected to the inlet cross 214 and each outlet cross 206 is connected to a corresponding frac tree 216, which has been installed on a respective wellhead 203. In particular, a number of high pressure lines 207a-207b connect the high pressure frac vessel 202 to corresponding inlet connection adapters 210 on the inlet cross 214. Also, each outlet connection adapter 242 on a particular outlet cross 206 is connected to a high pressure line 207 which in turn is connected to a corresponding inlet connection on the frac tree 216. Thus, while the inlet cross 214 is connected to multiple pumps lines, each frac tree 216 is connected to a single outlet cross 206. However, since each outlet cross 206 comprises multiple outlet passages 244, a single frac tree 216 may be connected to several high pressure lines 207. Moreover, since flow from the flow bore 220 into each outlet cross 206 is controlled by a corresponding valve 205, each of these high pressure lines 207 can be controlled with a single valve, or as in the case with a modern zipper manifold, dual valves with hydraulic actuators that are remotely controlled.

The block member 204 and the valves 205 are preferably supported on a single skid and connected to the skid by suitable means, such as mounting brackets (not shown). This arrangement allows the zipper manifold 201 to be transported and positioned on site as a unified assembly. Different versions of this type of arrangement, which provide more outlets such as four or six are in common use.

As discussed above, one problem faced with these prior art manifolds, particularly in view of the ever increasing number of frac stages, is the reliability of the valves. The need for valve repairs leads to downtime, as well as increased risk to personnel who have to work in the danger zone. Furthermore, remote operation can lead to operational disconnects in communication and incorrect routing of high pressure slurry, which is a main cause of accidents on fracing operations. A system is therefore required that eliminates the use of valves and replaces them with an advantageous arrangement, which will be referred to as a jumper manifold to distinguish it from a conventional zipper manifold.

FIG. 3A is a schematic plan view of one embodiment of the principles of the present invention showing a jumper manifold 300 installed. FIG. 3B is a side view of the jumper manifold 300 and FIG. 3c shows a detail of the manipulation of the jumper 308.

The function of the jumper manifold 300 is generally the same as in the prior art discussed in FIGS. 2A to 2A. However, jumper manifold 300 has no valves and is suitable for use with single large bore lines, instead of many small lines, a concept known as monobore in the industry.

In the embodiment of FIG. 3A, three wells 301a, 301b and 301c are shown being supplied by three monobore lines 302a, 302b and 302c, respectively. Monobore lines 302a, 302b, and 302c are connected to distribution spools 305a to 305c, which are preferably that the same type as spool 206 in FIG. 2A. Advantageously, jumper manifold 300 may be rigged up in the conventional way, with several outgoing lines for the spools 305a to 305c. In the example shown in FIG. 3A, the unused bore outlets on the spools 305 are plugged with a blind flange (not shown).

Similarly, the inlet line 303 is shown as a monobore, which can be replaced by multiple lines coming into spool 305d. Spools 305 can have 3 to 6 inlets or outlets each and are connected to blocks 314a to 314d. In alternate embodiments, spools 305a to 305d may be connected though a single block containing parts 305, 306 and 314. The blocks 314a to 314d have mechanical connectors 307a to 307d connected on top that can be remotely actuated to open and close and effect a connection. Preferably, the entire jumper manifold 300 assembly is mounted on a single skid 304.

Assuming, for discussion purposes, that it is desired to frac well 301a. Then a jumper 308, which is a pipe or other conduit with two end connectors, is installed between blocks 314a and 314d. Specifically, the jumper 308 is mechanically latched with connectors 307a and 307d respectively to effect a pressure tight connection.

Connectors 307b and 307c preferably have solid plugs installed (not detailed) so that the lines 302b and 302c are isolated form possible pressure sources 301b and 301c respectively. As a result, there is a direct connection from inlet line 303 to well 301a, such that well 301a is completely isolated from wells 301b and 301c, with no valves in the configuration that can leak, fail or be inadvertently operated. The mechanical connectors (latches) 307a to 307d preferably include pressure interlocks preventing their unlatching under pressure.

If it is desired to fracture the next stage for well 301b, then line 302b will be isolated by two valves on the frac stack (not shown) on well 301b, and depressurized by a bleed line (not shown). Then the connector 307b can be opened and the plug (not shown) removed. Thereafter line 302a from well 301a can be similarly isolated and depressurized as previously done for line 302b.

The upstream inlet line 303 from the frac pumps can be isolated by the dual isolation valves present in the main frac line (not shown, off skid) and bled off. Now the jumper 308 can be unlatched between connectors 307a and 307d, lifted and pivoted to enable latching with connector 307b, where previously the plug has been removed. The jumper 308 is lowered and then latched with connectors 307b and 307d. A blind plug is installed in latch 307a. Now well 301b can be worked with fracturing pressure, leaving well 301a and well 301c completely isolated for other activities like wirelining.

In FIG. 3B, the prior position 308a of jumper 308 is shown in broken lines and the new position 308b after changeover is indicated in solid lines. In FIG. 3C, a simple method of mechanical manipulation is shown with jumper 308 capable of being lifted and lowered by pistons 309a, 309b and 309c. A pivot point 310 is attached to a piston 311 and engaged in a cylinder 312 that is mounted on a stand 313 attached to skid 304. Stand 313 can move up and down as the jumper is raised and lowered and, by means of actuation, such as air or hydraulic fluid, can pivot the jumper into the desired position. There is any number of ways of achieving the desired manipulation of one end of the jumper 308 between connectors 307a to 307c, while the other end stays in alignment with connector 307d.

As the connection between the jumper and the plugs to the blocks is a vertical one, alignment can be carefully controlled and multiple seals or metal seals may be used, as there are no tolerance requirements, such as those required for moving a valve member. Consequently, the sealing system will be much more reliable than a valve and removes failure points.

In FIG. 4, another embodiment of the present principles is shown, which is designed to connect with up to six wells. An advantageous aspect of this embodiment is the circular nature of the arrangement, which enables numerous outlet legs to be assembled on a single manifold. In particular, outlet spools 305a, 305b, 305c, 305e, and 305f can be individually supplied by one inlet spool 305d connected to connector 307d. (Preferably, for all embodiments of the present principles, there is only one jumper, though a spare maybe carried.) It is very difficult or impossible to misconnect the jumper 308. Jumper 308 is shown installed between connector 307d on the inlet and connector 307a on the outlet. It can be moved by manipulation (not shown) to any of the outlet connectors 307b, 307c, 307e, 307f and 307g. Monobore lines may be used or multiple lines connected to spools 305.

Figure 5:
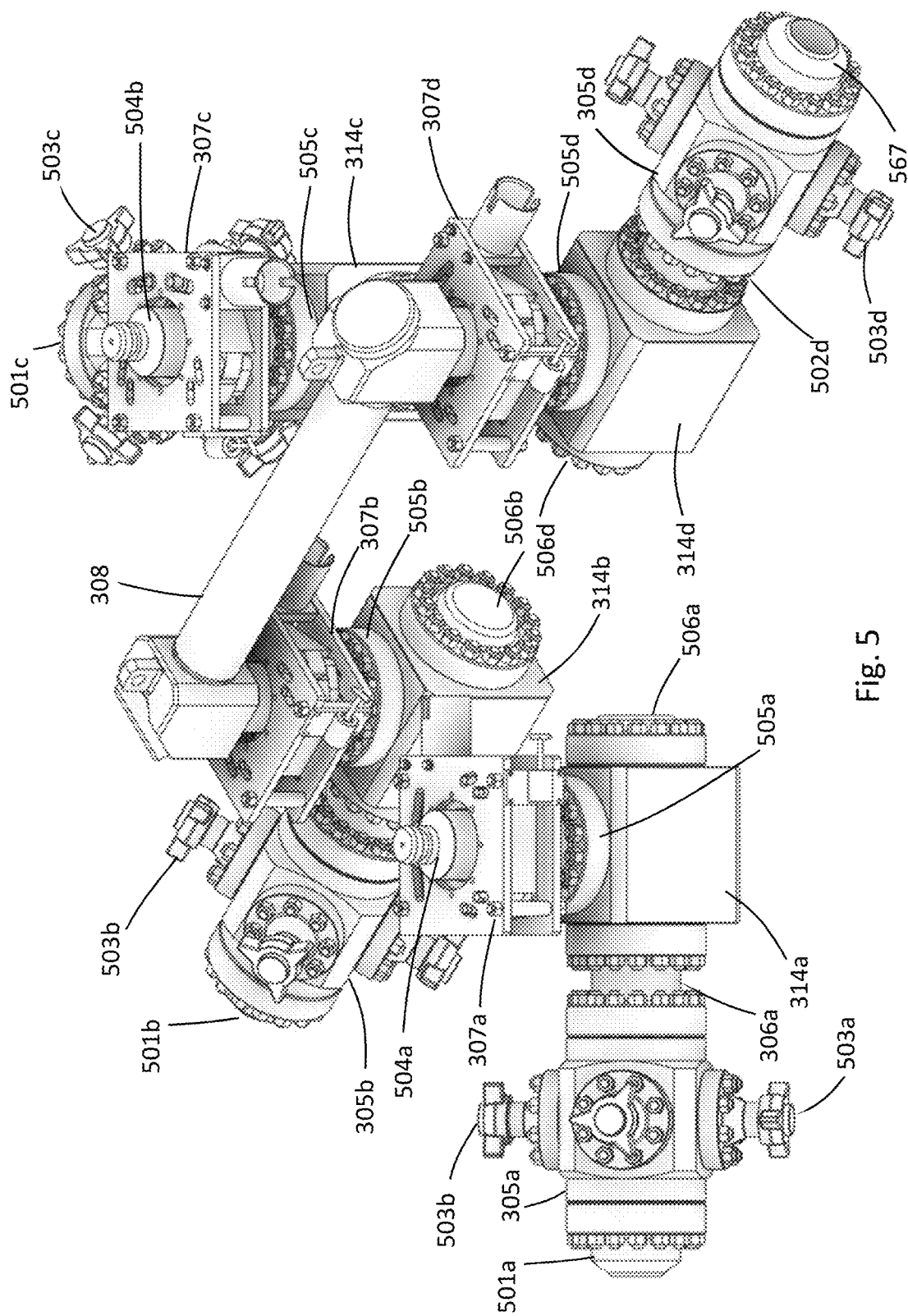
FIG. 5 is an isometric view of a particular embodiment of a jumper manifold according to the inventive principles.
Figure 6:
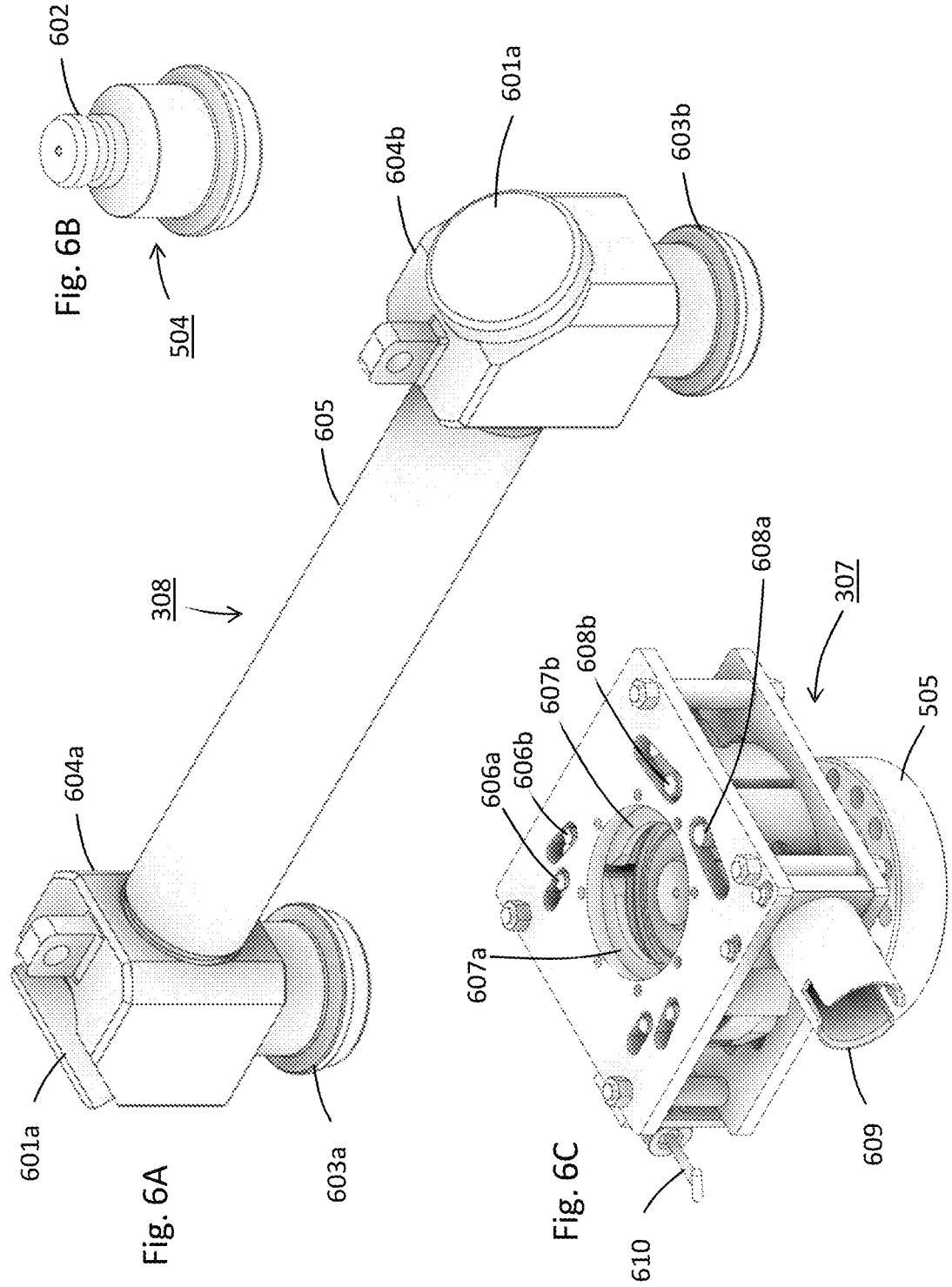
FIG. 6A is an isometric view of the jumper shown in FIG. 5.
FIG. 6B is an isometric view of a selected one of the plugs shown in FIG. 5.
FIG. 6C is an isometric view of a selected one of the clamping mechanisms shown in FIG. 5.

FIG. 5 is an isometric view of a particular embodiment of the invention. This example is configured for a monobore line with an inlet line flange 567 and outlet line flanges 501a-501c. The multiple inlet/outlet line options on spools 305a and 305d are capped with plugs 504a-504d. The blocks 314a-314d are designed as tee blocks with blind flanges 506a-506d on the unused side. This allows blocks 314a-314d to be rotated by 180 degrees if excessive erosion occurs on the flow outlet. The jumper 308 is shown installed between inlet connection mechanism 307b and outlet connection mechanism 307d.

FIG. 6A is an isometric view of the jumper 308 from FIG. 5 and consists of a tube 605 that is welded or connected by other means to two identical blocks 604a-604b. These blocks 604a-604b have upper adapters 603a-603b attached with a profile suitable for the connector mechanism shown in FIG. 6C and a sealing system (not shown). The blocks 604a-604b have threaded caps 601a-601b set into the corner of the blocks, which are removable, replaceable pieces to accommodate the inevitable erosion by fracing fluid through the ninety degrees turn in the blocks 604a-604b.

FIG. 6B is an isometric view of a plug 504 having the same connector profile as adapters 603 with a sealing system (not shown). The plug 504 has a handling profile 602 that allows easy latching and unlatching for a mechanical handling system for installing or removal of the plugs.

FIG. 6C is an isometric view of a connection mechanism 307 that is commonly used for hub connectors. Each connection mechanism 307a-307d is mounted on a lower adapter 505a-505d that has a top face (not visible) that can mate with the sealing system (not shown) on adapters 603 located on the jumper 308 and plugs 504. It has three latching clamps (only latching clamps 607a-607c are visible) that can rigidly grip the upper adapters 603 and sealingly connect them to the corresponding lower adapter 505. The connection mechanism 307 has a rotating adapter 609 that rotates and then opens or closes the clamp mechanism as guided by pins 608a-608b. Additional guide pins 606a-606b guide the other latching clamps 607a-607b concentrically. A visual indicator 610 shows if the clamp is closed or open. The rotating adapter 609 can be driven by electrical, pneumatic or hydraulic means. This is just one example of a latching mechanism that could be used for the jumper manifold of FIG. 3A. Other latching systems are possible.

Figure 7:
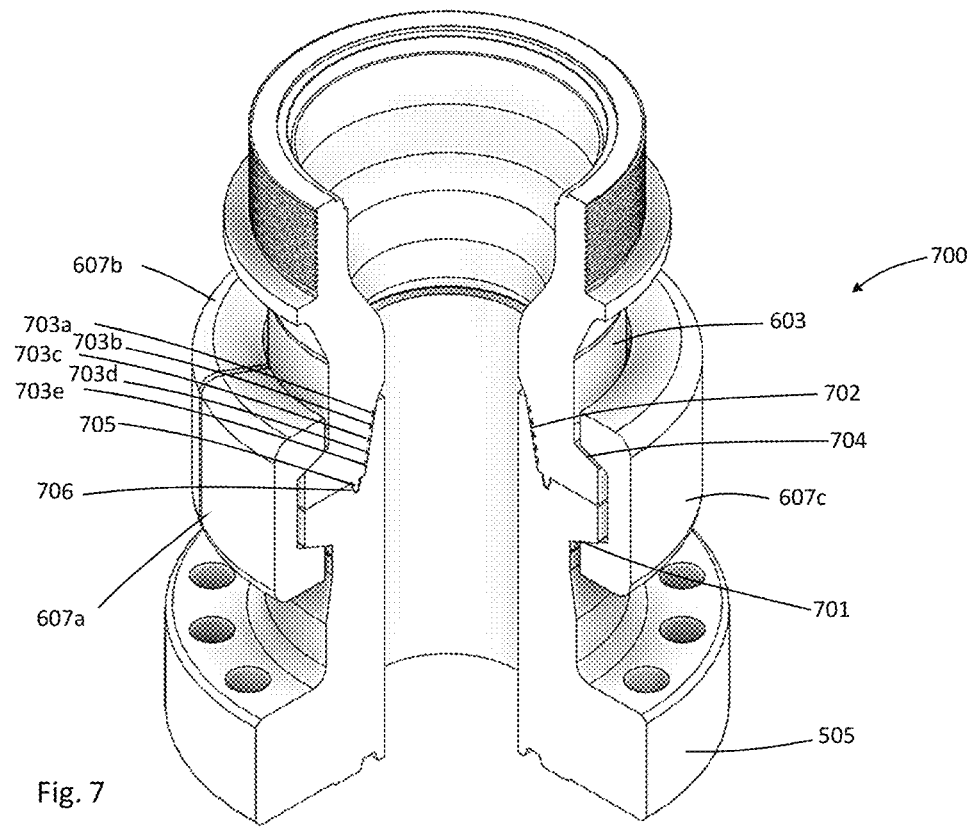
FIG. 7 is an isometric view of the detail of a selected one of the connector assemblies of FIG. 5 with a quarter cut-out.

FIG. 7 is an isometric view of a connector assembly 700, consisting of an upper adapter 603 and a lower adapter 505, with a partial cut-out. This can be closed and opened by the rotating adapter 309 described in FIG. 6C, which acts on the three latching clamp segments 607a-607b. The upper adapter 603 is shown with a threaded connection that connects to the blocks 604a-604b (FIG. 6A), but it could also be a weld. Adapter 603 could also be replaced by the blind plug 504 shown in FIG. 5. The three latching clamps 607a-607b have internal tapers that when driven inward, act against the corresponding tapers 704 and 701 of the connector to pull the upper adapter 603 and lower adapter 505a-505d together until sealing at the sealing interface 702. The particular requirements of this connector include providing the required performance of several hundred connect/disconnect cycles, without losing seal integrity when the connection is under high pressure, as well as enduring the particular peculiarities of fracing fluids. These requirements have been addressed by the following features which will be explained in detail: a) vertical movement for connection/disconnection; b) operable without grease as this is not desirable due to the frac particulates; c) multiple seals so that any one seal failure will not affect performance; d) seals on the movable and removable items, plugs and jumper(s), that can be easily replaced and serviced; e) designed to be able to handle spill of frac fluids with particulates without affecting sealing performance.

These design requirements preclude the use of metallic seals or other hard seals, which could be affected by frac particulates, such as sand. The possibility of sand entrapment also precludes the use of a pre-loaded connector. The choice of seals 703a-703e is for resilient seals which may have a back-up ring or scraper ring as part of the individual seal or seal assembly. A secondary guide, consisting of a circumferential protrusion 706 on the upper adapter 603, engages in a corresponding circumferential groove 705 on the lower adapter 505.

Figures 8A, 8B:
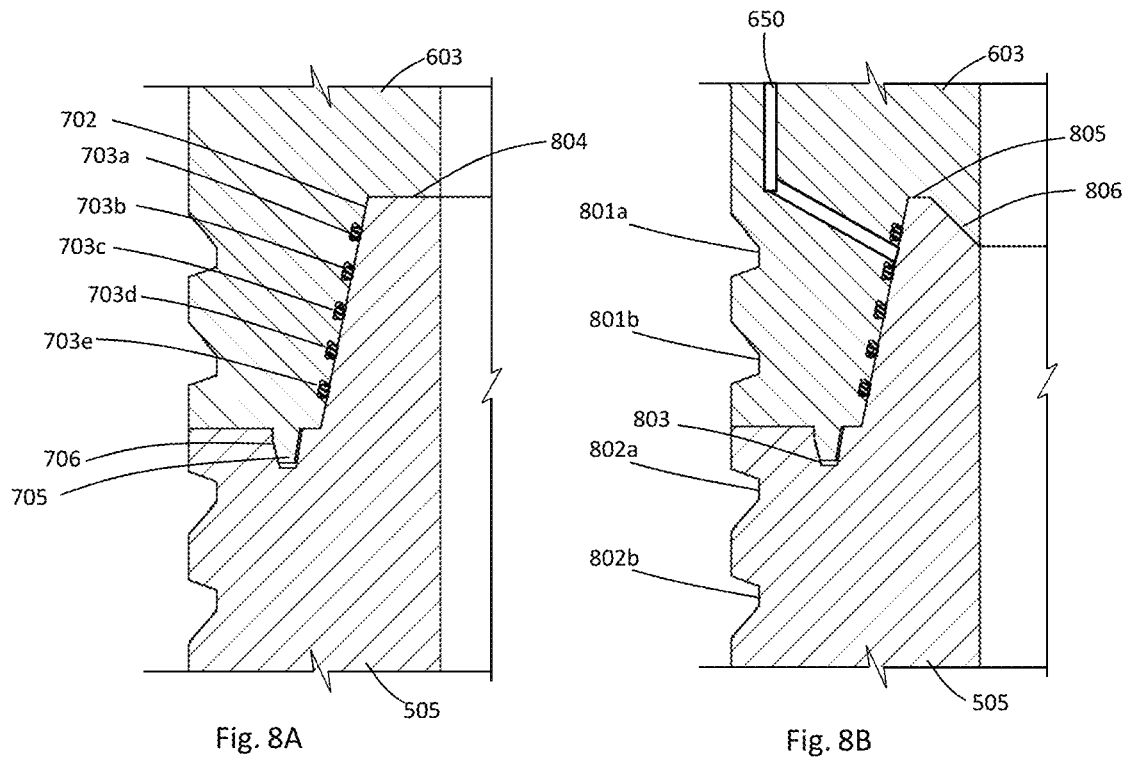
FIG. 8A is a partial cross-section of an alternate embodiment of the connector of FIG. 7.
FIG. 8B is a partial cross section of an alternative embodiment of the connector in FIG. 7.

FIG. 8A is a partial cross section of the connector 700 in FIG. 7. For simplicity in this and subsequent drawings, the upper adapter 603 and lower adapter 505 from the connector 700 are shown as ending in cylindrical pipes. Adapters 505 and 603 may have suitable interfaces as required for the jumper manifold design shown in FIGS. 3A-3B or embodiments thereof. In FIG. 8B, a different clamping mechanism is shown that uses multiple shoulders 801a-801b and 802a-802b shown in the connected position. The driving tolerance for the connector is the clearance along the sealing interface 702 which must maintain the maximum allowable extrusion gap for the seals 703a to 703e under maximum pressure in the internal bore of the connector. As the contact interface 804 can be contaminated with sand, and thus interfere with the optimum gap allowance of 702, the connector 700 can be modified with a design like that shown in FIG. 8B with a smaller shoulder 805 and a sloping shoulder 806. There are other possible variations of this theme with multiple shoulders and gaps below, similar to the gap 803 at the bottom of groove 705.

Also shown in FIG. 8B is a test port 650 that enables pressure to be applied between seal rings 703a and 703b. This feature enables verification of the seals without having to apply a pressure to the bore of a connector, which advantageously allows personnel to quickly verify the pressure integrity of the connection, given the multitude of connect and disconnect steps that are typically required. While shown between seal rings 703a and 703b of the embodiment of FIG. 8B the port 650 could be between any 2 sets of seal rings 703. Furthermore, multiple test ports 650 may be provided, if so desired. For example, one test port 650 may be provided between the upper seals 703a and 703b, as shown, and another test port 650 provided between the two lower seals 703d and 703e.

FIG. 9A is an alternate connector 900 in the disconnected position and FIG. 9B shows this alternate embodiment 900 in the connected position. Like parts with the previous figures are labelled the same. This connector uses dogs 903a-903e that can be engaged and disengaged with a latching mechanism (discussed below). Dogs 903a-903e have tapered grooves that engage with corresponding grooves 801a-801b on the upper adapter 603, as well as with grooves 802a-802b on the lower adapter 505 of the connector 900. Thus, the connector can be latched as shown in FIG. 9B. This embodiment also has another seal 901 that can engage with the surface 804. As can be seen in FIG. 9A, the tapered sealing surface 902 as well as the upper surface 804 are free of any seals, which means all the seal maintenance or replacement can be done on the removable or replaceable parts with the lower adapter 505 being rigidly connected to the jumper manifold assembly shown in FIG. 3A, by way of a flange as shown in FIG. 5.

Figure 10A:
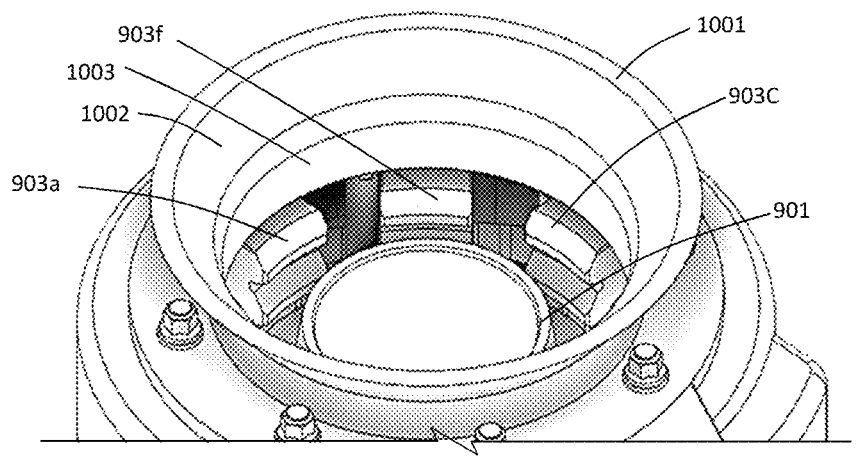
FIG. 10A is the detail of the guide for the connector of FIG. 7.
Figure 10B:
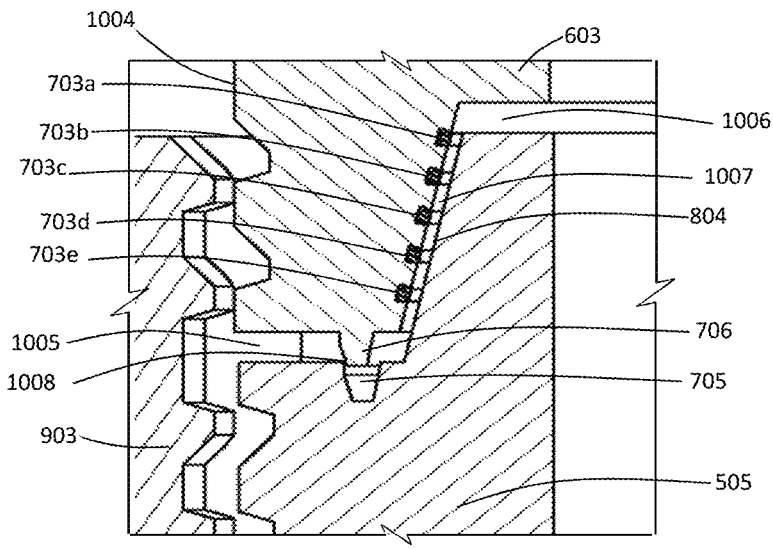
FIG. 10B is a partial cut away view of the connector of FIG. 7.

FIG. 10A is the detail of the guide for the connector 900 and FIG. 10B is a partial cut away view of the connector of FIG. 900. These serve to illustrate several features of the invention. Firstly, a two-step guide mechanism ensures that there is minimal contact between seals 703a-703e and the sealing surface 902 before the connection is made and conversely minimal contact when the connection is broken. In this manner the abrasion on the seals is minimized to assure integrity over several hundred connect/disconnect cycles. This dual guide mechanism consists of an initial rough guide followed by a precise final guide.

FIG. 10A is a perspective view of the connector 900 with a guide funnel 1001 attached. The guide funnel 1001 has a tapered surface 1003 and a cylindrical face 1003. These serve to guide the upper adapter 603 with cylindrical surface 1004 (FIG. 10B) being guided. This pre-aligns the connector such that any shaking cannot result in contact between seals 703a-703e and the seal surface 804. At a certain vertical displacement, the circumferential protrusion 706 enters the circumferential groove 705 when it contacts at point 1008. At this stage, the interaction between parts 706 and 705 becomes the precise secondary guide, which exactly centres the connector thereby preventing seal contact until just before complete connection travel. Due to the geometry of the design, the contact gaps 1005 and 1006 are much larger than the contact gap 1007, making the design resilient to contamination by entrapped particles in the gaps 1005 and 1006, which will have further enhancements to reduce sand entrapment that could hinder the correct working gap at interface 702 (FIG. 4A) once gap 1007 has closed.

Figure 10C:
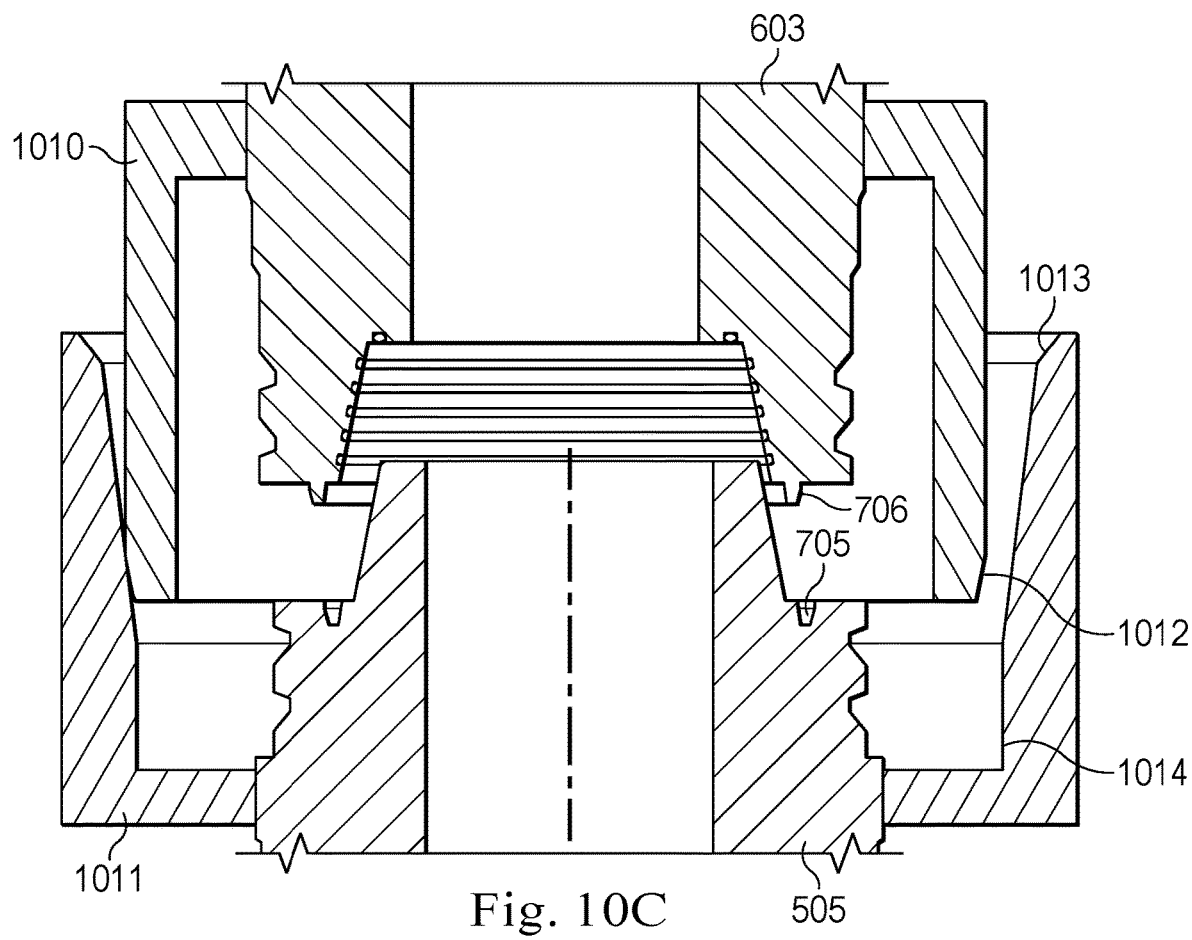
FIG. 10C is a cut away section illustrating an alternative method of initial guiding of the connector in FIG. 7 with external guides.

FIG. 10C illustrates an alternate method of preliminary guiding. A cross-section of the connector in FIG. 9A with external guides is shown. This configuration includes a guide 1010 attached to upper adapter 603 and a lower guide 1013 attached to the lower adapter 505. As the upper connector is lowered, the tapered shoulder 1011 engages in tapered shoulder 1013 of the lower adapter 505 until centering in the cylindrical bore 1014 of the lower guide 1011. This centers the upper adapter 603 and lower adapter 505 to stop any direct contact until circumferential protrusion 706 engages with circumferential groove 705 to commence the secondary precise guidance.

Figure 11A:
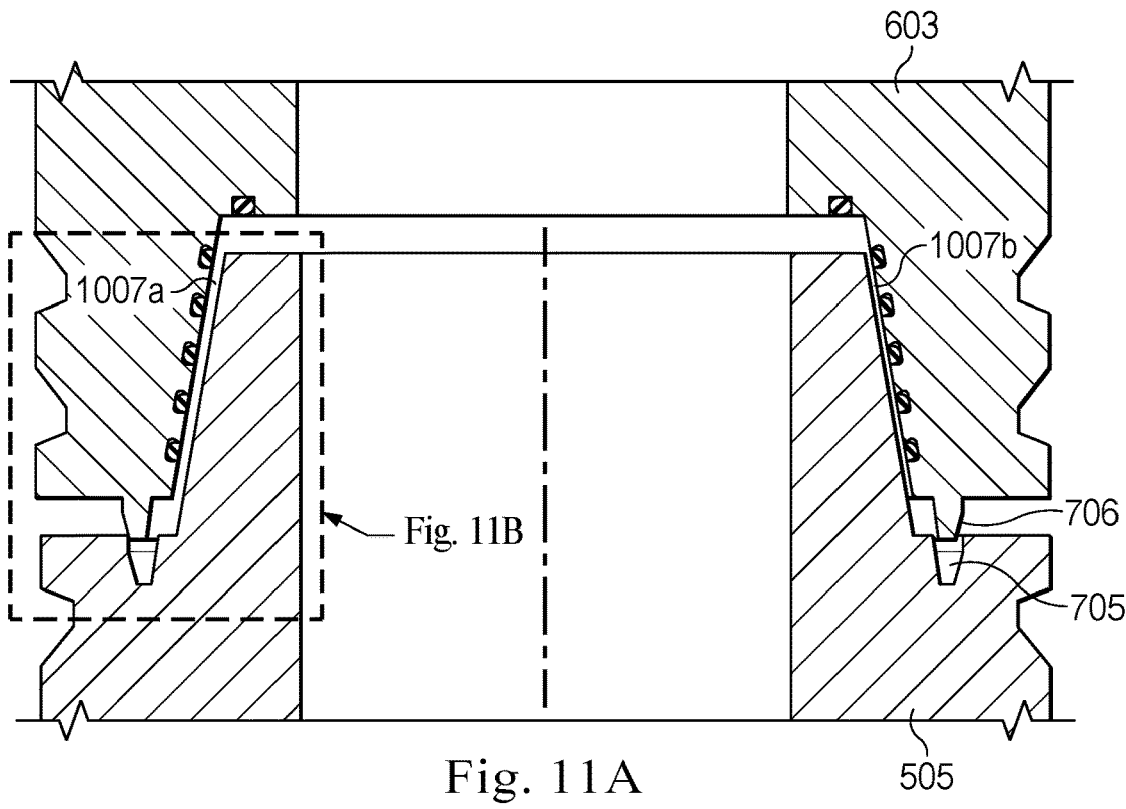
FIG. 11A shows the connector of FIG. 7 in cross section to illustrate the secondary guide mechanism.
Figure 11B:
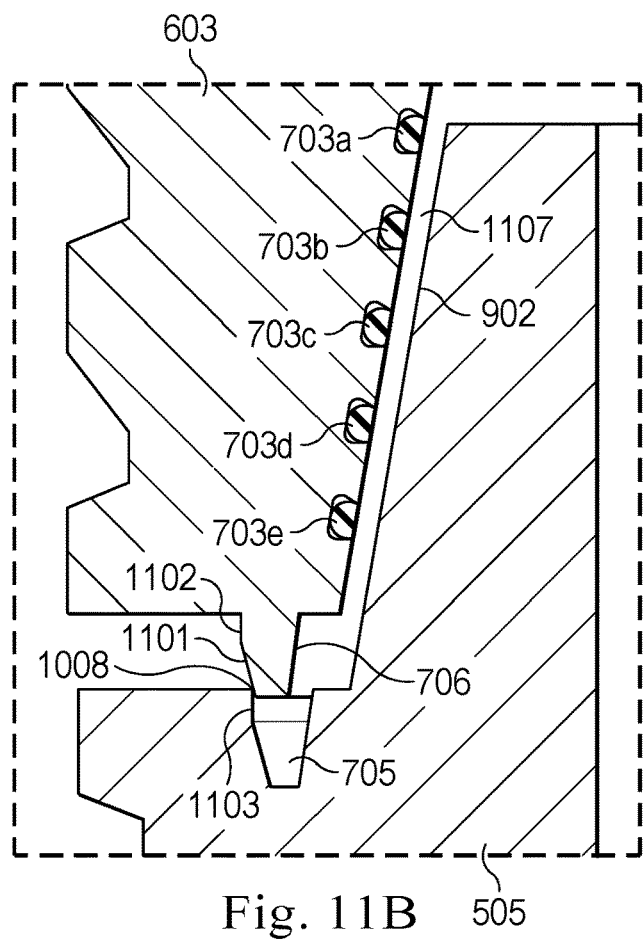
FIG. 11B shows a detail of the secondary guide mechanism of FIG. 11A.

FIG. 11A shows the connector 900 of FIG. 9A in cross-section to illustrate the secondary guide mechanism. FIG. 11B shows a detail of FIG. 11A. The tolerance on the primary guide is set such that the protrusion 706 can engage in the groove 705 without any contact between the seals 703a to 703e and the seal surface 902. In FIG. 11A the upper adapter 603 is displaced to the left based on the maximum primary guide tolerance, as illustrated by a larger gap 1007a on the left hand side compared to the right hand side 1007b. The seals are not touching the sealing surface and the protrusion 706 can enter the groove 27. In FIG. 11B this detail can be seen with the protrusion 706 just contacting the groove at contact 1008. The tapered edge 1101 on the protrusion then guides the upper connector precisely until the upper shoulder 1102 engages with the corresponding shoulder 1103 in the groove 705. At this point the two connectors are very precisely guided so that the seals only contact the sealing surface just before complete connection.

Figure 12A:
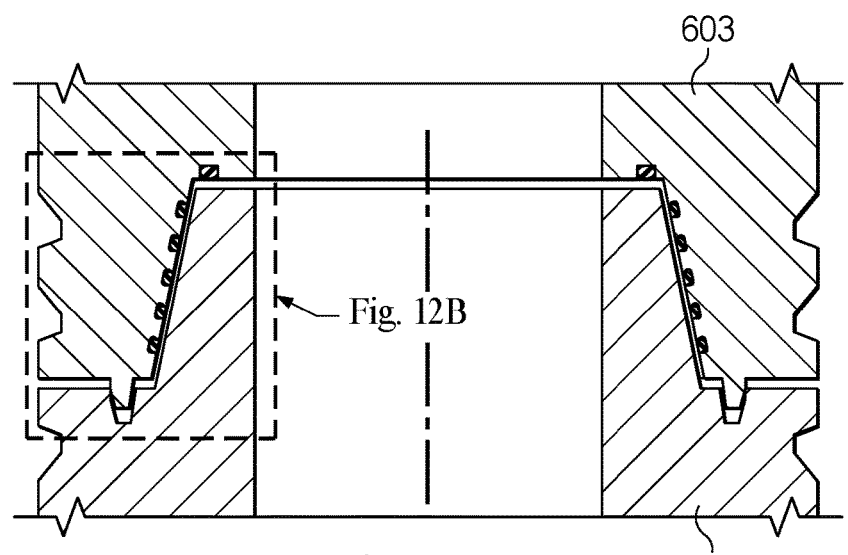
FIG. 12A shows the connector cross section from FIG. 11A slightly further engaged.
Figure 12B:
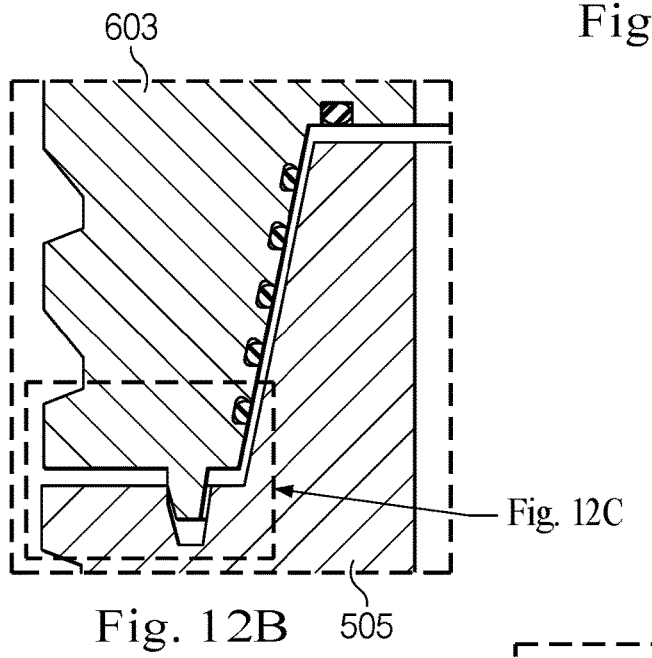
FIG. 12B shows a detail of FIG. 12A.
Figure 12C:
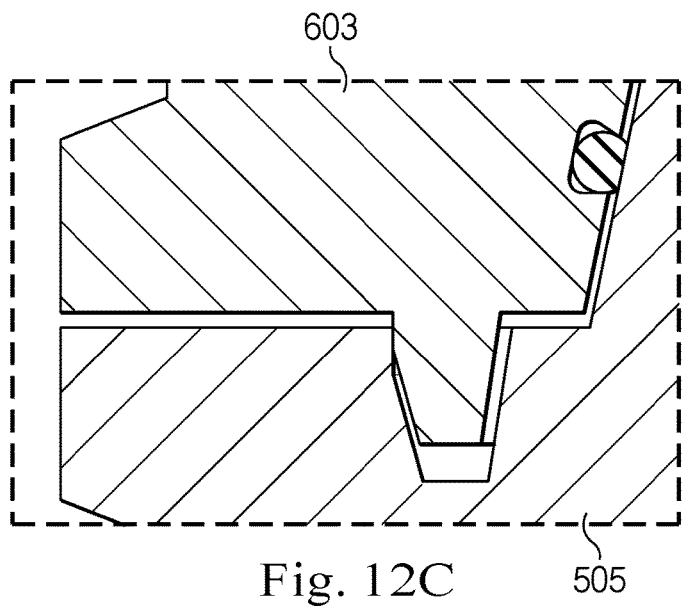
FIG. 12C shows the detail of FIG. 12B with further engagement.

FIGS. 12A to 12C illustrate the detailed secondary guidance mechanism of the cross-section from FIG. 11A. FIG. 12B is the detail of FIG. 12A and FIG. 12C is the detail of FIG. 12B with further travel and the connector almost closed. The lower adapter 505 surface 902 as well as the corresponding face on upper adapter 603 can be coated with a low friction coating like a Teflon based coating.

Figure 13A:
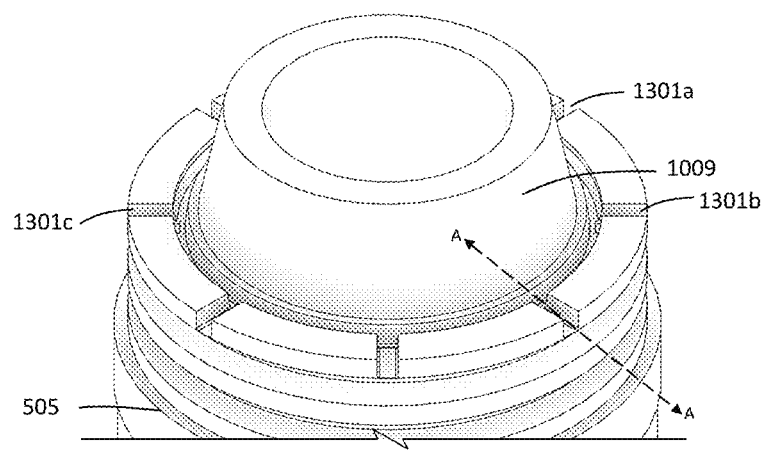
FIG. 13A shows another feature of the bottom part of the connector from FIG. 7.
Figure 13B:
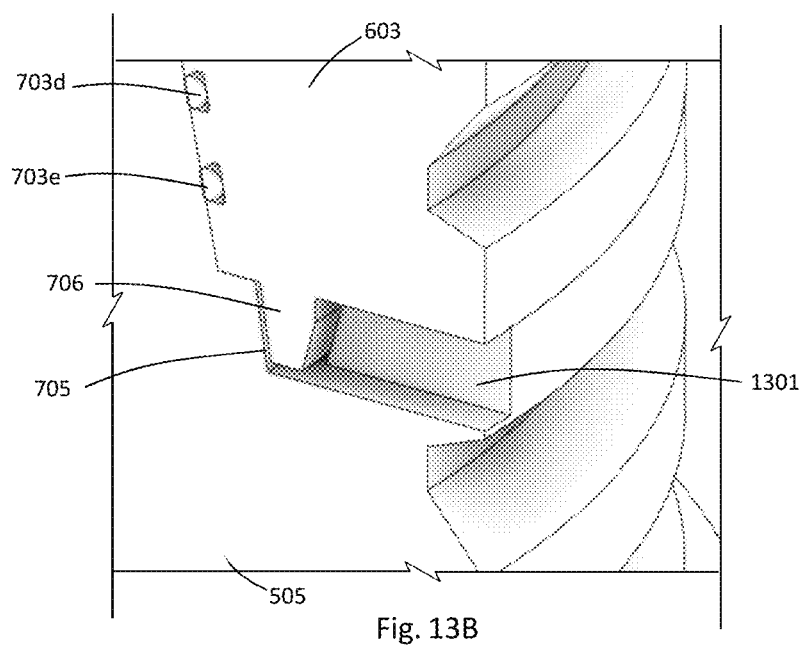
FIG. 13B shows a partial detail from a section A-A of the connector of FIGS. 13A and 7.

In FIGS. 13A and 13B a sand relieving system is illustrated. Such a system is necessary as the jumper manifold 300 (FIG. 3A) will usually be lower than the level of the lines 302 (FIG. 3A) connecting to the well head. So it is possible, even after flushing with clean fluid and depressurizing the lines, that when the adapter 505 and 603 are moved apart that some frac sand fluid mixture can flood back and spill over the connector face 902. In FIG. 13A, several slots 1301a-1301c have been added to drain groove 705. FIG. 13B is a detail at section A-A from FIG. 13A with the upper adapter 603 added to show how sand build up in groove 705 cannot affect the closure of the connector.

FIG. 14A shows another embodiment 1400 of a jumper manifold connector with an actuation assembly, the upper adapter 603 is not present in this depiction. Flange 1402 is attached or integral with the sealing surface 902 the connector. FIG. 14B shows an isometric quarter cut-out of the full connector assembly 1400. A housing 1401 covers the actuation mechanism and two counter rotating rings 1405 and 1406. The dogs 903 are forced outwards by a circular spring 1403 (FIG. 15B). In FIG. 14B, the locking dogs 903 are shown in the unlocked position such that the upper adapter 603 with the interface connection to the jumper 308 can be removed.

FIG. 15A shows the detail of two locking dogs in the opposite orientation. The locking dogs 903 have a central groove 1501 facing inwards towards the bore and hold the spring 1403 (FIG. 15C) in place. The locking dogs 903 have opposing chafers 1504 and 1505 that interfere with similar chamfers on the locking rings 1405 and 1406 to create movement of the dogs.

In FIG. 15C, a detailed cross section of the connector 1400 assembly is shown with the locking dog 903 fully engaged into the shoulders 801*a* and 801*b* on the upper adapter 603 and into the shoulders 802*a* and 802*b* of the lower adapter 505. The secondary guide 706 is fully engaged in the groove 705 and the seals 703 are fully engaged (not all seals shown). In this embodiment, an alternative or supplemental spring 1503 is shown which also serves, same as the spring 1403, to always push the dogs 903 out from the bore. The cams (not visible) on the locking rings 1405 and 1406 have pushed on the chamfers 1504 and 1505 of the dog 903 to into place, which has locked upper adapter 603 to lower adapter 505. In this position, the connector 1400 is fully locked and ready to take pressure.

FIGS. 14C-14F show various assembly configurations to illustrate the function of the connector mechanism. They are not in assembly order and are shown with some parts of the assembly removed to clarify functionality. In FIG. 14C eight dogs 903 are assembled on the lower adapter 505. The lower adapter 505, the flange 1402 and the lower support plate 1407 for the dogs are preferably machined from a single piece. In FIG. 14B, the funnel guide 1001 is rigidly fixed to the support plate 1409 with bolted spacers 1404, which serve to keep a constant rigid gap between the upper mounting plate 1409 and the lower support plate so that two counter rotating rings can move freely without binding.

FIGS. 14E and 14F show the lower rotating ring 1406 supported on the lower support plate 1402 (not visible). Preferably, a friction reducing washer is disposed between rings 1405 and 1406, although there could be captive bearing balls held between groves machined in rings 1405 and 1406. The lower rotating ring 1406 has internal chamfers that act on the corresponding chamfer 1505 of the dogs 903 and the upper rotating ring 1405 has chamfers 1414 to act on the corresponding chamfer 1505 of the dogs 903. Between rings 1405 and 1406, and also between the upper surface of ring 1406 and the bottom surface of upper mounting plate 1407, a friction reducing washer or bearings are preferably disposed.

Referring to FIG. 14F, gear profiles 1410 and 1411 are respectively mounted to upper rotating ring 1405 and lower rotating ring 1406 by mounting plates with bolts and 1412 1413. These gear profiles, when acted on by external gears with rotate the rings 1405 and 1406 in opposing direction act on the dogs 903 to lock and unlock the adapters 505 and 603. As the connector 1400 uses resilient seals to minimize preloading of adapters 505 and 603, this will be a low torque operation for counter rotating rings 1405 and 1406.

Figure 16A:
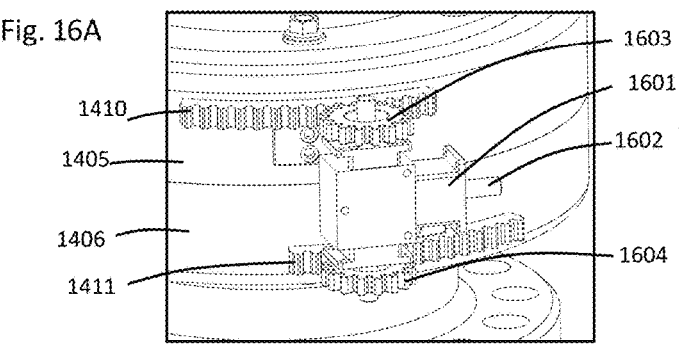
FIG. 16A is a side view of an actuation mechanism embodying according to the principles of the present invention.
Figure 16B:
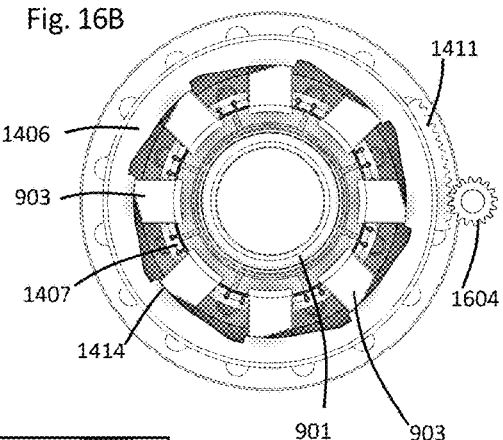
FIG. 16B is a top view cross section of the connector of FIG. 7.
Figure 16C:
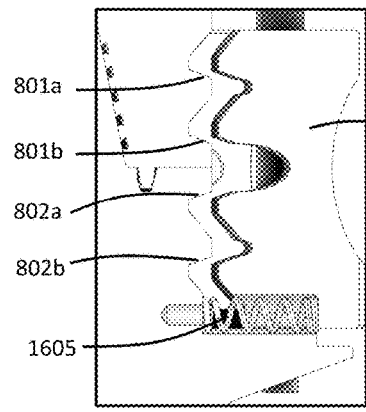
FIG. 16C is a detailed cross-section of the connector dog of FIG. 16B in the open position.
Figure 16D:
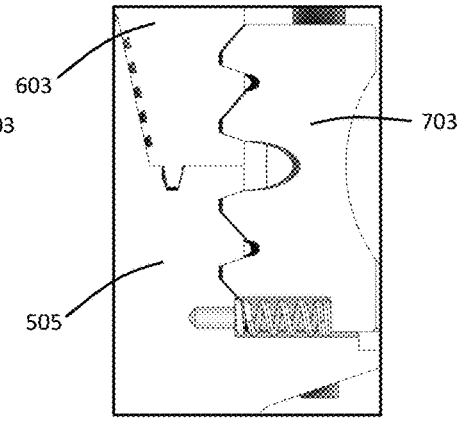
FIG. 16D is a detailed cross-section of the connector dog of FIG. 16B in the closed position.

FIGS. 16A to 16D detail the operation of connector 1400. FIG. 16A shows a typical off the shelf three way gear assembly 1601, which when the shaft 1602 is rotated, drives the gears 1603 and 1604 in opposing clock directions, which in turn counter rotate rings 1405 and 1406 in opposing directions. FIG. 16B shows the lower ring 1406 in the closed position with the chamfer 1414 at maximum displacement pushing in the dog 903 to the fully engaged position, as shown in FIG. 16D. Rotating gear 1504 in FIG. 16B counter clockwise displaces the ring 1406 clockwise enabling the dogs 903 to move outwards under the spring force from spring 1403 and/or springs 1605 (not visible) thus unlocking the connector as shown in FIG. 16C.

The function of the upper ring 1405 is the same but in opposing direction, meaning that clockwise rotation of gear 1504 turns the upper ring 1405 counter-clockwise to unlock the upper part of the dogs 903. The very large open spaces internal to the connector are there by design to enable good drainage of any residual fluids and frac sand contaminants in the lines upstream and downstream of the connector. There are multiple intricacies of the detail of the support plate 1402 to aid this drainage and to make the connector sand resistant during operation.

This counter rotating ring design is self-locking in that no amount of force on the dogs 903 can rotate the rings so it is a failsafe connector.

Figure 17:
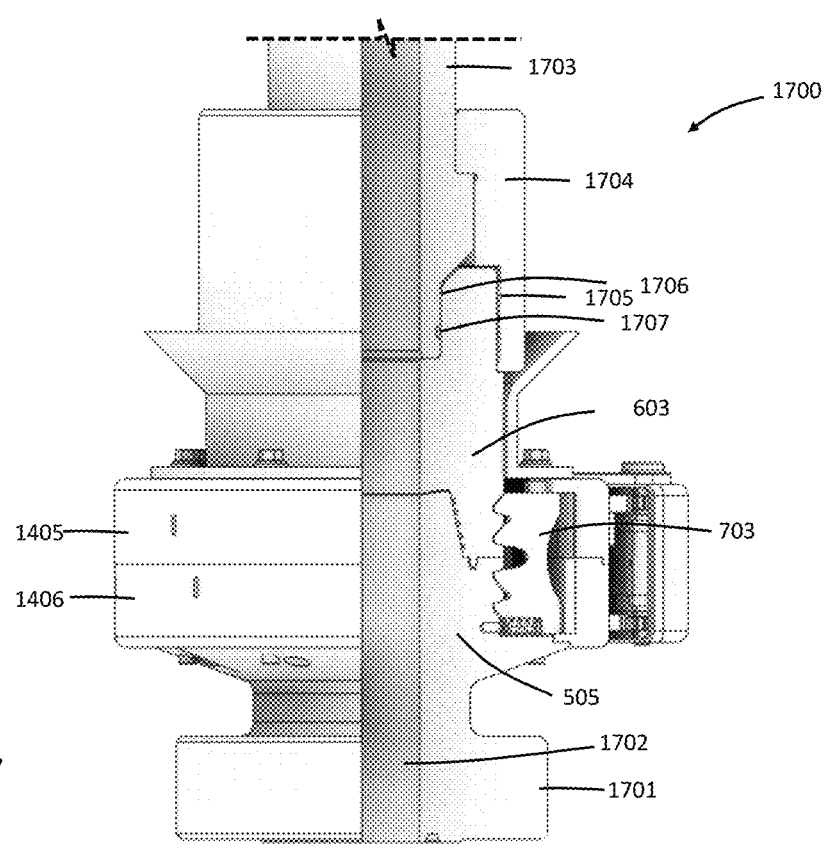
FIG. 17 is side view with a half cross section of an alternative connector embodiment of the configured as a wireline connector.

FIG. 17 shows an alternative embodiment of the connector as assembly 1700, which has been modified to act as a high pressure wireline connector on top of the fracing stack and provides interface between the crown valve (uppermost valve) and the wireline lubricator assembly. In assembly 1700, the actuator size and function has remained exactly the same as previously described. The bore is shown reduced as, typically, the wireline lubricator has a 5⅛ inch bore. The external connector dimensions of actuators 505 and 603 also remain unchanged with just the bore 1702 reduced, and a 5⅛×15000 psi API flange 1701 on bottom. The upper actuator 603 has been modified to provide a lubricator thread interface with a parallel seal bore 1706 and seal 1707, as typically used for wireline lubricator connections having an Acme thread 1705 that interfaces with a nut 1704 attached to a lubricator section 1703.

This configuration is an advantageous connector for the wireline operations, as the connection between adapters 505 and 603 can be carried out remotely and is a better system than the parallel lubricator interface for the multiple opening and closing operations (up to 1600 times per well for each fracing stage) required.

Figure 18:
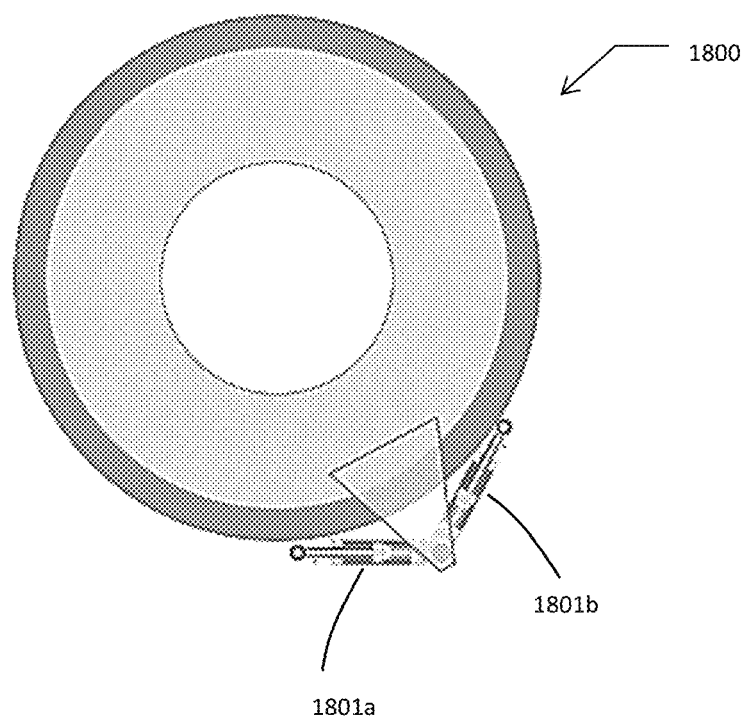
FIG. 18 is a top cross-sectional view of an alternate embodiment of the connector, which uses dynamic hydraulic actuation.

FIG. 18 is an alternate connector embodiment 1800 using a dynamic hydraulic actuation mechanism employing hydraulic pistons 1801*a* and 1801*b*. Similar to three way gear assembly 1601, hydraulic pistons 1801*a*-1801*b* counter rotate rings 1405 and 1406 in opposing directions to lock and unlock dogs 903.

In summary, jumper manifolds embodying the inventive principles achieve a number of primary functions, including: (1) replacing the manifold valves with a jumper; (2) allow sealing caps to be installed in open ports; (3) enable pressure sources, such as the fracing factory or the well under pressure, to be completely disconnected; (4) ensure that only the well being fraced is connected to the fracing factory; (6) maintain the idle well and the wireline/coiled tubing well fully isolated from any pressure source; and (7) provide a system that is more reliable, given that there are no moving parts under pressure.

Furthermore, the following secondary features enable a superior system compared to current state of the art zipper manifolds: (1) the jumper is remotely operated to move between ports and remotely latched; (2) caps can be remotely installed and removed; (3) the jumper connector can have multiple seals compared to valves, which only have one sealing interface; (4) maintenance of seals is quick, as all seals are situated on the jumper and there is a spare jumper ready; and (5) a test port enables testing of the connector by allowing application of pressure between the seals from a remote test pump, which in turn allows personnel to verify the jumper connections without having to pressure test the entire line.

The various jumper connector embodiments allow multiple resilient seals to engage with minimum contact until just before closure of the connector.

In other words, the principles of the present invention provide a very cost-effective method for preventing failures experienced with current zipper manifold designs with valves by eliminating the valves completely and replacing them with a jumper and sealing blank plugs.

Embodiments of the principles of the present invention realize a number of significant advantages, including increased safety, since the automated system eliminates the possibility of human error that could otherwise result in routing pressure to pumps and exposing personnel during maintenance activities. In addition, these embodiments reduce non-productive time (NPT) as there are no valves to repair.

Although the invention has been described with reference to specific embodiments, these descriptions are not meant to be construed in a limiting sense. Various modifications of the disclosed embodiments, as well as alternative embodiments of the invention, will become apparent to persons skilled in the art upon reference to the description of the invention. It should be appreciated by those skilled in the art that the conception and the specific embodiment disclosed might be readily utilized as a basis for modifying or designing other structures for carrying out the same purposes of the present invention. It should also be realized by those skilled in the art that such equivalent constructions do not depart from the spirit and scope of the invention as set forth in the appended claims.

It is therefore contemplated that the claims will cover any such modifications or embodiments that fall within the true scope of the invention.

What is claimed is:

1. A connector system comprising:
   a first connector having a bore and a set of teeth on an outer surface;
   a second connector having a second bore and a set of teeth on an outer surface;
   at least one dog having an inner surface with a first set of teeth adapted to engage the set of teeth of the first connector, a second set of teeth adapted to engage the set of teeth of the second connector, and a spring for biasing the dog outward from the outer surfaces of the first and second connectors to disengage the first and second sets of teeth of the dog from the sets of teeth of the first and second connectors;
   a first ring adapted to rotate across a first outer surface of the dog to apply pressure against the bias of the spring; and
   a second ring adapted to rotate across a second outer surface of the dog to apply pressure against the bias of the spring, the first and second rings thereby forcing the first and second sets of teeth of the dog into engagement with the sets of teeth of the first and second connectors.

2. The connector system of claim 1, wherein:
   the first ring comprises a chamfer on an internal surface adapted to engage a corresponding chamfer on the first surface of the dog to apply pressure against the bias of the spring when the first ring rotates in a first locking direction; and
   the second ring comprises a chamfer on an internal surface adapted to engage a corresponding chamfer on the second surface of the dog to apply pressure against the bias of the spring when the second ring rotates in a second locking direction.

3. The connector system of claim 1, wherein the first and second locking directions are opposing directions.

4. The connector system of claim 1, further comprising:
   a first set of gear teeth disposed on an outer surface of the first ring;
   a second set of gear teeth disposed on an outer surface of the second ring; and
   a set of rotating gears for engaging the first and second sets of gear teeth to rotate the first and second rings.

5. The connector system of claim 1, wherein the dog is a selected one of a plurality of dogs adapted to engage the sets of teeth of the first and second connectors.

6. The connector system of claim 5, wherein each of the plurality of dogs includes a groove in an inner surface and the spring comprises a circular spring extending through the groove on each of the plurality of dogs.

7. The connector system of claim 6, wherein the plurality of dogs are disposed equally spaced around the outer surface of the first connector.

8. The connector system of claim 1, further comprising:
   a displacement mechanism disposed on an outer surface of the first ring;
   a second displacement mechanism disposed on an outer surface of the second ring; and
   whereby displacement of the displacement mechanisms in opposing directions from a fixed point will rotate the rings in opposing clock directions.

* * * * *